(12) United States Patent  
Eidam et al.

(10) Patent No.: US 11,727,483 B1
(45) Date of Patent: *Aug. 15, 2023

(54) SMART TABLE ASSISTED FINANCIAL HEALTH

(71) Applicant: Wells Fargo Bank, N.A., San Francisco, CA (US)

(72) Inventors: Kourtney Eidam, Marietta, CA (US); Darren M. Goetz, Salinas, CA (US); Dennis E. Montenegro, Concord, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/897,019

(22) Filed: Aug. 26, 2022

Related U.S. Application Data

(63) Continuation-in-part of application No. 17/088,068, filed on Nov. 3, 2020, now Pat. No. 11,429,957, (Continued)

(51) Int. Cl.
*G06Q 40/02* (2023.01)
*A47B 21/007* (2006.01)
*G06V 40/16* (2022.01)

(52) U.S. Cl.
CPC .......... *G06Q 40/02* (2013.01); *A47B 21/007* (2013.01); *G06V 40/174* (2022.01); *A47B 2021/0076* (2013.01)

(58) Field of Classification Search
CPC ..... G06Q 40/02; G06V 40/174; A47B 21/007
See application file for complete search history.

(56) References Cited

U.S. PATENT DOCUMENTS 6,430,542 B1 8/2002 Moran
6,493,469 B1 12/2002 Taylor et al.
(Continued)

FOREIGN PATENT DOCUMENTS

CN 107977776 5/2018
CN 108198076 6/2018
(Continued)

OTHER PUBLICATIONS

Cho et al.; Interaction for Tabletop Computing Environment an Analysis and Implementation 8 Pages.
(Continued)

*Primary Examiner* — Seth A Silverman
(74) *Attorney, Agent, or Firm* — Foley & Lardner LLP

(57) ABSTRACT

A smart table display system includes a display surface and a processing circuit configured to retrieve provider data stored in a provider database, retrieve, by a user device, third party data stored in a third party database located remote from the provider system, generate a graphical user interface comprising a graphic that depicts a financial health of a user based on the provider data and the third party data where the graphic is built in real-time while the provider data and the third party data is received, and provide the graphical user interface on the display surface of the smart table display system, where retrieving at least one of the provider data or the third party data comprises retrieving at least one of the provider data or the third party data from a non-volatile memory of the user device via the communications device utilizing a screen-scraping method.

20 Claims, 15 Drawing Sheets

Related U.S. Application Data which is a continuation-in-part of application No. 17/079,958, filed on Oct. 26, 2020, now Pat. No. 11,397,956, and a continuation-in-part of application No. 17/079,971, filed on Oct. 26, 2020, and a continuation-in-part of application No. 17/079,961, filed on Oct. 26, 2020.

(56) References Cited

U.S. PATENT DOCUMENTS

| | | |
|---|---|---|
| 6,667,738 B2 | 12/2003 | Murphy |
| 6,866,388 B2 | 3/2005 | Yang |
| 7,027,040 B2 | 4/2006 | Rekimoto et al. |
| 7,403,191 B2 | 7/2008 | Sinclair |
| 8,194,045 B1 | 6/2012 | Maloney et al. |
| 8,195,576 B1 | 6/2012 | Grigg et al. |
| 8,206,047 B1 | 6/2012 | Isaac et al. |
| 8,207,872 B2 | 6/2012 | Huang et al. |
| 8,346,672 B1 | 1/2013 | Weiner et al. |
| 8,356,712 B2 | 1/2013 | Piazza, Jr. |
| 8,438,110 B2 | 5/2013 | Calman et al. |
| 8,451,248 B1 | 5/2013 | Kim |
| 8,502,789 B2 | 8/2013 | Tse et al. |
| 8,549,589 B2 | 10/2013 | Stollman |
| 8,700,772 B2 | 4/2014 | Saint Clair |
| 8,743,072 B2 | 6/2014 | Kim |
| 8,854,330 B1 | 10/2014 | Maloney et al. |
| 9,024,884 B2 | 5/2015 | Lengeling et al. |
| 9,075,429 B1 | 7/2015 | Karakotsios |
| 9,104,886 B1 | 8/2015 | Dolbakian et al. |
| 9,141,280 B2 | 9/2015 | Van Eerd et al. |
| 9,292,129 B2 | 3/2016 | Tsang et al. |
| 9,411,467 B2 | 8/2016 | Argiro |
| 9,430,140 B2 | 8/2016 | Reuschel et al. |
| 9,529,514 B2 | 12/2016 | Saint Clair |
| 9,560,076 B2 | 1/2017 | Schultz et al. |
| 9,576,105 B2 | 2/2017 | Cho |
| 9,588,680 B2 | 3/2017 | Van Eerd et al. |
| 9,590,968 B2 | 3/2017 | Stollman |
| 9,665,259 B2 | 5/2017 | Lee et al. |
| 9,715,476 B2 | 7/2017 | Megiddo et al. |
| 9,746,981 B2 | 8/2017 | Zachut et al. |
| 9,747,499 B2 | 8/2017 | Kim et al. |
| 9,749,395 B2 | 8/2017 | Dawson et al. |
| 9,769,216 B2 | 9/2017 | Gaetano, Jr. |
| 9,774,653 B2 | 9/2017 | Hinckley et al. |
| 9,794,306 B2 | 10/2017 | Riecken et al. |
| 9,883,138 B2 | 1/2018 | Chen et al. |
| 9,898,663 B2 | 2/2018 | Wexler et al. |
| 9,924,019 B2 | 3/2018 | Jeganathan et al. |
| 9,953,479 B1 | 4/2018 | Sawant et al. |
| 9,990,814 B1 | 6/2018 | Eidam et al. |
| 10,055,046 B2 | 8/2018 | Lengeling et al. |
| 10,096,011 B2 | 10/2018 | Camp |
| 10,230,844 B1 | 3/2019 | Ellis et al. |
| 10,262,509 B1 | 4/2019 | Kourtney et al. |
| 10,332,200 B1 | 6/2019 | Fournier et al. |
| 10,367,912 B2 | 7/2019 | Saint Clair |
| 10,484,437 B2 | 11/2019 | Banyai et al. |
| 10,485,341 B2 | 11/2019 | Dash et al. |
| 10,540,014 B2 | 1/2020 | Gribetz et al. |
| 10,565,643 B2 | 2/2020 | Rohn et al. |
| 10,567,481 B2 | 2/2020 | Dawson et al. |
| 10,579,228 B2 | 3/2020 | Vida et al. |
| 10,614,219 B2 | 4/2020 | Knapp et al. |
| 10,735,709 B2 | 8/2020 | Moss et al. |
| 10,891,688 B1 | 1/2021 | Clausen et al. |
| 10,970,549 B1 | 4/2021 | Krishnan et al. |
| 11,195,355 B1 | 12/2021 | Goetz et al. |
| 2001/0037287 A1 | 11/2001 | Broadbent et al. |
| 2002/0070964 A1 | 6/2002 | Botz et al. |
| 2003/0069828 A1 | 4/2003 | Blazey et al. |
| 2003/0108241 A1 | 6/2003 | Colmenarez et al. |
| 2004/0075642 A1 | 4/2004 | Kisliakov |
| 2004/0233216 A1 | 11/2004 | Rekimoto et al. |
| 2005/0178074 A1 | 8/2005 | Kerosetz |
| 2005/0185825 A1 | 8/2005 | Hoshino et al. |
| 2005/0269404 A1 | 12/2005 | Landwirth et al. |
| 2005/0289045 A1 | 12/2005 | Lawson |
| 2006/0101508 A1 | 5/2006 | Taylor |
| 2007/0296545 A1 | 12/2007 | Clare |
| 2007/0296579 A1 | 12/2007 | Mayer et al. |
| 2007/0300307 A1 | 12/2007 | Duncan |
| 2009/0056599 A1 | 3/2009 | Turner et al. |
| 2009/0174673 A1 | 7/2009 | Ciesla |
| 2009/0315830 A1 | 12/2009 | Westerman |
| 2010/0062811 A1 | 3/2010 | Park et al. |
| 2010/0066667 A1 | 3/2010 | Macdougall et al. |
| 2010/0238119 A1 | 9/2010 | Dubrovsky et al. |
| 2010/0302168 A1 | 12/2010 | Giancarlo et al. |
| 2011/0035695 A1 | 2/2011 | Fawcett et al. |
| 2011/0256019 A1 | 10/2011 | Gruen et al. |
| 2011/0260976 A1 | 10/2011 | Larsen et al. |
| 2012/0032783 A1 | 2/2012 | Ahn et al. |
| 2012/0119999 A1 | 5/2012 | Harris |
| 2012/0204116 A1 | 8/2012 | Patil et al. |
| 2012/0204117 A1 | 8/2012 | Patil et al. |
| 2013/0249947 A1 | 9/2013 | Reitan |
| 2014/0012754 A1 | 1/2014 | Hanson et al. |
| 2014/0168107 A1 | 6/2014 | Kim |
| 2015/0020191 A1 | 1/2015 | Vida et al. |
| 2015/0059002 A1 | 2/2015 | Balram et al. |
| 2015/0109099 A1 | 4/2015 | Birkel et al. |
| 2015/0135101 A1 | 5/2015 | Ellis et al. |
| 2015/0221035 A1 | 8/2015 | Anderson et al. |
| 2015/0278534 A1 | 10/2015 | Thiyagarajan et al. |
| 2015/0279310 A1 | 10/2015 | Itakura et al. |
| 2016/0034901 A1 | 2/2016 | Ferren |
| 2016/0037346 A1 | 2/2016 | Boettcher et al. |
| 2016/0071224 A1 | 3/2016 | Huang |
| 2016/0180614 A1 | 6/2016 | Micali et al. |
| 2016/0191576 A1 | 6/2016 | Thompson et al. |
| 2017/0099453 A1 | 4/2017 | Junuzovic et al. |
| 2017/0103440 A1 | 4/2017 | Xing et al. |
| 2017/0115742 A1 | 4/2017 | Xing et al. |
| 2017/0118645 A1 | 4/2017 | Zarakas et al. |
| 2017/0169506 A1 | 6/2017 | Wishne et al. |
| 2017/0180336 A1 | 6/2017 | Josephson et al. |
| 2017/0227938 A1 | 8/2017 | Wexler et al. |
| 2017/0278358 A1 | 9/2017 | Ino et al. |
| 2017/0356218 A1 | 12/2017 | Beasley et al. |
| 2018/0041493 A1 | 2/2018 | Wilkinson et al. |
| 2018/0060812 A1 | 3/2018 | Robinson et al. |
| 2018/0089349 A1 | 3/2018 | Rezgui |
| 2018/0096386 A1 | 4/2018 | Aggarwal et al. |
| 2018/0101985 A1 | 4/2018 | Jones-Mcfadden et al. |
| 2018/0108207 A1 | 4/2018 | Lyons et al. |
| 2018/0122187 A1 | 5/2018 | Moore et al. |
| 2018/0247134 A1 | 8/2018 | Bulzacki et al. |
| 2018/0268747 A1 | 9/2018 | Braun |
| 2018/0293087 A1 | 10/2018 | Lee et al. |
| 2018/0301111 A1 | 10/2018 | Park et al. |
| 2018/0328099 A1 | 11/2018 | Whitaker et al. |
| 2018/0356885 A1 | 12/2018 | Ross et al. |
| 2018/0357850 A1 | 12/2018 | Moore et al. |
| 2019/0019011 A1 | 1/2019 | Ross et al. |
| 2019/0034895 A1 | 1/2019 | Camp |
| 2019/0108524 A1 | 4/2019 | Nicholson et al. |
| 2019/0114585 A1 | 4/2019 | Fee et al. |
| 2019/0121522 A1 | 4/2019 | Davis et al. |
| 2019/0228494 A1 | 7/2019 | Stasi et al. |
| 2019/0228609 A1 | 7/2019 | Nguyen et al. |
| 2019/0268321 A1 | 8/2019 | Kim et al. |
| 2019/0306709 A1 | 10/2019 | Kim et al. |
| 2019/0328339 A1 | 10/2019 | Gujral et al. |
| 2019/0360259 A1 | 11/2019 | Green et al. |
| 2020/0000341 A1 | 1/2020 | Messerschmidt et al. |
| 2020/0034106 A1 | 1/2020 | Jain et al. |
| 2020/0056418 A1 | 2/2020 | Dobbins et al. |
| 2020/0064960 A1 | 2/2020 | Munemoto |
| 2020/0066079 A1 | 2/2020 | Swaine et al. |
| 2020/0187694 A1 | 6/2020 | Santangeli et al. |

(56) References Cited

U.S. PATENT DOCUMENTS

2020/0218493 A1  7/2020  Sim et al.
2020/0301720 A1  9/2020  Choi
2022/0255920 A1  8/2022  Bester et al.

FOREIGN PATENT DOCUMENTS

| | | |
|---|---|---|
| CN | 108255462 | 7/2018 |
| CN | 109471687 | 3/2019 |
| CN | 109983491 | 7/2019 |
| EP | 2 919 209 | 9/2015 |
| JP | 6555129 B2 | 8/2019 |
| KR | 2019002815 A | 1/2019 |
| WO | WO-2019/019743 | 1/2019 |
| WO | WO-2019/098992 | 5/2019 |

OTHER PUBLICATIONS

Dani Deahl, This All-In-One Smart Desk Has Three Screens and a Built-In Scanner; Jun. 25, 2018. 2 Pages.
Scott Cary; How Capital One Taught Amazon's Alexa Ai Assistant To Help You Manage Your Money. Nov. 30, 2016; 4 Pages.
K. M. Everitt, et al. "DocuDesk: An interactive surface for creating and rehydrating many-to-many linkages among paper and digital documents," IEEE 2008, pp. 25-28, doi: 10.1109/TABLETOP.2008.4660179. (Year: 2008).

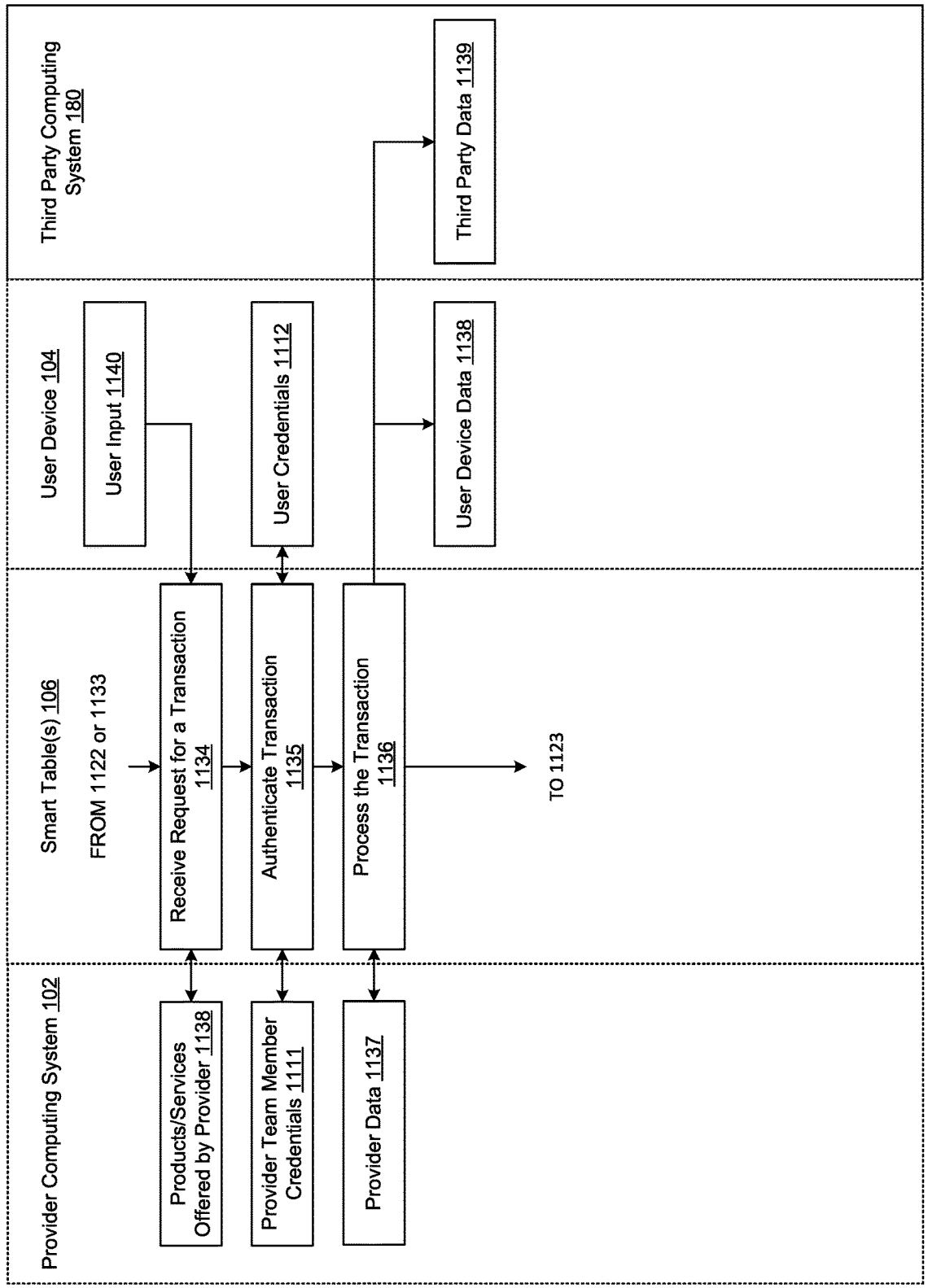

SMART TABLE ASSISTED FINANCIAL HEALTH

CROSS-REFERENCE TO RELATED APPLICATIONS

This application is continuation of U.S. patent application Ser. No. 17/088,068 filed Nov. 3, 2020, which is a continuation-in-part of U.S. patent application Ser. No. 17/079,971 filed Oct. 26, 2020, a continuation-in-part of U.S. patent application Ser. No. 17/079,961 filed Oct. 26, 2020, and a continuation-in-part of U.S. patent application Ser. No. 17/079,958 filed Oct. 26, 2020, each of which are incorporated herein by reference in their entirety.

TECHNICAL FIELD

This application relates generally to the use of a smart table to improve efficiency and ease of conducting transactions at a provider location associated with a provider. More specifically, this application relates to systems and methods for smart table assisted financial health.

BACKGROUND

Customers of a provider are able to access a variety of services through software applications, such as mobile applications on user devices, to perform various tasks. For example, customers may use an internet enabled application to conduct transactions, change settings, and carry out other actions related to a customer account or with respect to a product offered by the provider. However, certain transactions and tasks may require a customer to visit a provider location (e.g., due to security, needing to meet with a provider representative).

SUMMARY

One example embodiment relates to a smart table display system. The smart table display system includes a display surface having a touchscreen, a microphone, and a communications device. The microphone is configured to receive a conversation input. The conversation input includes a conversation between a user and a team member of a provider. The communications device is configured to communicate with a provider database of a provider system and a user device associated with the user. The smart table display system also includes a processing circuit. The processing circuit is configured to receive, by the microphone, the conversation input. The processing circuit is also configured to retrieve, by the communications device, provider data based on an interpretation of the conversation input. The provider data includes a first user financial data associated with the user and stored in the provider database. The processing circuit is also configured to retrieve, by the communications device and the user device, third party data based on the interpretation of the conversation input. The third party data includes a second user financial data associated with the user and stored in a third party database located remote from the provider system and accessible by the user device. The processing circuit is also configured to generate a graphical user interface that includes a graphic. The graphic depicts a financial health of the user based on the conversation input, the provider data, and the third party data. The graphic is built in real-time while the conversation input is received. The processing circuit is also configured to provide the graphical user interface on the display surface of the smart table display system. The smart table display system is located at a branch location of the provider.

Another example embodiment relates to a smart table display system. The smart table display system includes an interactive display surface having a touchscreen, a plurality of sensors, and a processing circuit. The processing circuit is configured to receive an user input from a user via the plurality of sensors. The user input is an audio or visual input. The processing circuit is also configured to retrieve a provider data associated with the user and a provider system. The processing circuit is also configured to retrieve a third party data associated with the user and a third party. The processing circuit is also configured to generate a first graphic depicting a financial health of the user. The financial health of the user is based on the user input, the provider data, and the third party data. The first graphic is built in real-time as the user input is received. The processing circuit is also structured to provide the first graphic on the interactive display surface.

Another example embodiment relates to a smart tabletop display system. The smart tabletop display system includes a display surface having a touchscreen configured to receive a touch input from a user, a microphone configured to receive an audio input from the user, a camera configured to receive an image of the user, and a communication device. The communication device is configured to communicate with a user device and retrieve third party data associated with the user via the user device based on the audio input or the image. The communication device is also configured to communicate with a provider system via a provider network and retrieve provider data associated with the user via the provider network based on the audio input or the image. The smart tabletop display system also includes a processing circuit. The processing circuit is configured to receive the touch input, the audio input, the image, the third party data, and the provider data. The processing circuit is also configured to generate a graphical user interface comprising a first graphic and a second graphic, wherein the first graphic and the second graphic are built in real-time and are based on at least one of the audio input or the image. The second graphic is a duplicate of the first graphic. The processing circuit is also configured to provide the graphical user interface on the display surface with the first graphic in a first orientation for the user to view and the second graphic is in a second orientation for a different party to view.

These and other features, together with the organization and manner of operation thereof, will become apparent from the following detailed description when taken in conjunction with the accompanying drawings.

BRIEF DESCRIPTION OF THE DRAWINGS

FIG. 11C is a flow diagram of a method for processing a transaction on the smart table of FIG. 1A.

Figure 1A:
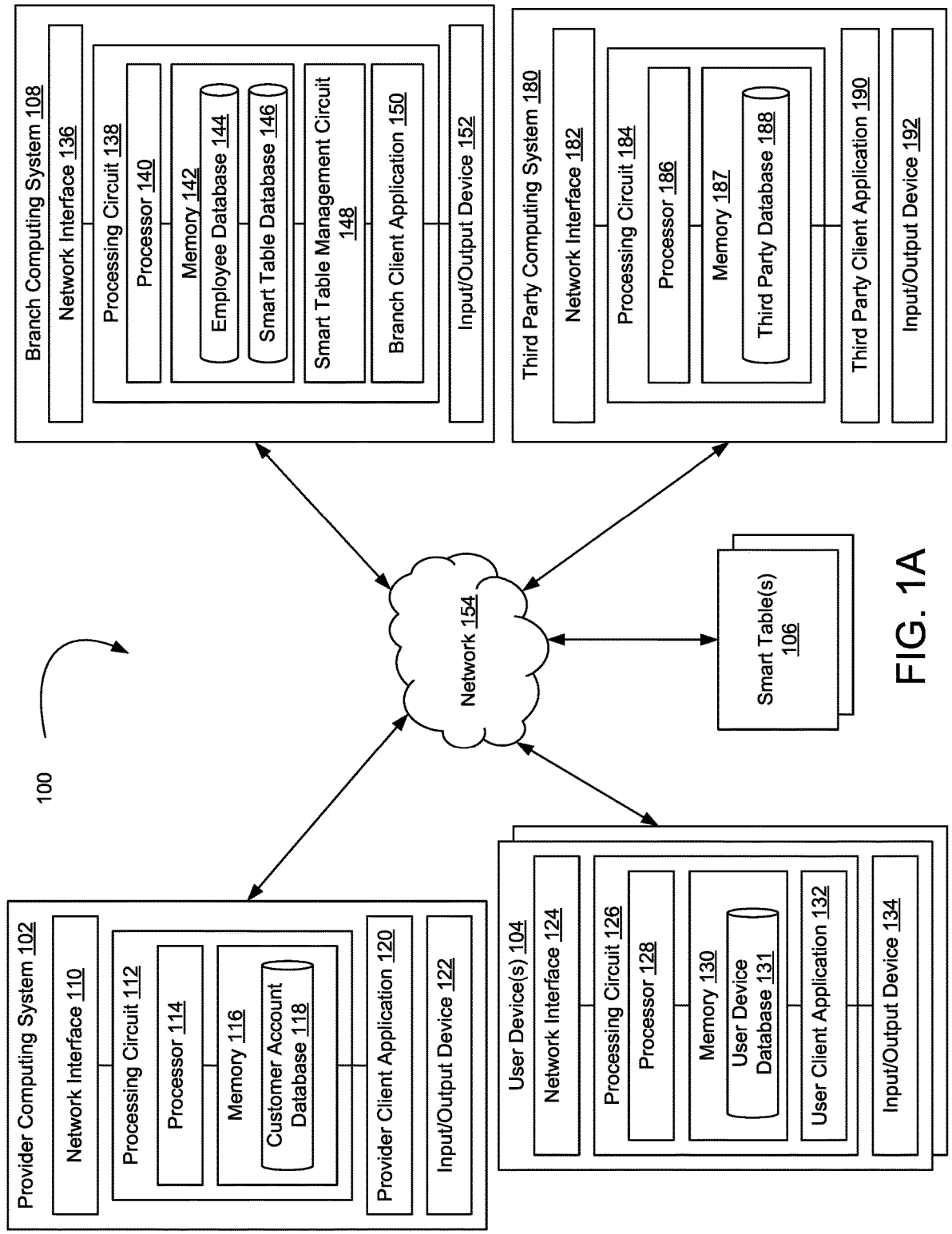
FIG. 1A is a block diagram of a smart table system including a provider computing system and a smart table, according to example embodiments.

It will be recognized that the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the figures, a smart table system that is configured to assist with transactions and provide a visualization of a financial health checkup, and associated methods, are shown and described. According to an exemplary embodiment, a smart table having an interactive display and various interfaces is configured to provide a graphic depicting a financial health of a customer on the display. The smart table also includes a processing circuit configured to receive, via the various interfaces, financial data associated with the customer and determine the financial health of the customer based on the financial data. The processing circuit is also configured to receive, via the various interfaces, physical data (e.g., tactile input, audio input, current mood or disposition, body language, hand gestures, etc.) associated with the customer and update the financial health of the customer based on the physical data.

In many systems, a computing device (e.g., desktop computer, mobile device, smart device) can present variety of content (e.g., icons, graphics, images, etc.) on a graphical user interface. Typical computing devices may arrange the content alphabetically, chronologically, or by file content properties such as file types. However, if a user wants to present the content in a particular sequence, orientation, etc. or quickly modify the content itself, the user needs to manually manipulate the arrangement of the content and/or the content itself.

Accordingly, the systems and methods described herein provide an improved content management tool for the generation, modification, and arrangement of content. In particular, the systems and methods provided herein are directed to configuring content based on the environment in which one or more users are present and various computing devices (e.g., smart table, smart headsets, IoT devices, sensors, etc.) within the environment. That is, the content on the graphical user interface may be automatically generated, modified, and arranged based on environment data and sensor data associated with a user or users. In some implementations, the described systems and methods involve generating and providing a graphical user interface based on sensor data. The graphical user interface and content thereon is continuously and automatically updated by utilizing a variety of computing devices to work in combination. The content includes graphs, charts, tables, or other depictions of data and is displayed in a desired configuration to the user or users. Providing the graphical user interfaces on the one or more computing devices is an improvement in the human-machine interaction process as the user is provided with an improved interface to view the content and new content is generated for the user based on data received from more sources than would otherwise be possible and the new content is presented to the user in new formats on the smart table system that are not possible using traditional display screens. Furthermore, the user or users do not need to manually manipulate the content to view a desired arrangement of the content or to view updated versions of the content. Furthermore, the graphical user interfaces can ensure, for example, that the content is presented in a manner such that the user can understand, further improving the end user experience.

The present disclosure provides improvements to traditional systems by providing a smart table system that can organize content on a graphical user interface on a tabletop surface based on the user preferences and environmental data (e.g., smart table, smart headsets, IoT devices, sensor data, and so on). Moreover, this technical solution enables smart table systems to customize user experiences on smart table devices to improve engagement, and noticeability of content, and to generate new content that is built in real-time while the conversation input is being received based on the conversation input, provider data, and third party data that cannot otherwise be created using traditional systems. Therefore, aspects of the present disclosure also address problems in content presentation by providing improved presentation technology for the presentation of content on smart table computer devices.

Therefore, aspects of the present disclosure also address problems in generating graphical user interfaces (GUI) which include representations of data by providing improved GUI generation methods on smart table computing devices. In particular, the present disclosure addresses the technical challenges in providing an improved GUI that includes a summary of historical data and projected data based on the historical data. Moreover, the improved GUI is based on user inputs (e.g., audio input, images of the user, etc.) from a user such that the data summaries dynamically change based on the user inputs. Accordingly the data summaries provided by the GUI improve the efficiency of the electronic devices by selectively displaying relevant historical data and predicted data based on user inputs.

Additionally, the present disclosure is directed to improvements of user interfaces for electronic devices, thus improving upon conventional user interfaces to increase the efficiency of using electronic devices (e.g., smart tables, mobile devices, and so on). For example, the graphical user interfaces can display on the screen tasks and indicators (e.g., icons, notifications, magnifications, and so on) that can be displayed and/or navigated to and displayed on various devices, such that the tasks and indicators display user specific data and can enable data to be selected and adjusted. In another example, one or more process circuits of the electronic devices can determine the amount of use (e.g., selected five times, utilized once, and so on) of each tasks and indicators over a period of time and determine how much memory has been allocated to various tasks and indicators over a period of time (e.g., tracking memory usage during sessions and over a period of a time) such that adjustments to the user interface can be done in real-time (e.g., end high memory usage processes, allocate more memory usage to certain processes, enable more memory for usage, and so on). Moreover, the present disclosure is directed to improvements of identity verification such that a user can be verified for sessions. For example, the identity verification can include provisioning a random code (e.g., token) to a communication device of the user and receive correspondence back from the communication device of the user including authentication information (e.g., biometric data, token, geometric data) such that one or more processors of the provider can analyze and authenticate the user (e.g., cross-reference a token vault, cross-reference biometric templates, cross-reference latitude and longitude of known locations) for one or more sessions at the provider (e.g., automatically send a control signal to an input of the smart table system to provide access to view user interfaces on a smart headset and/or smart table).

The processing circuit is configured to initiate a transaction including a financial health checkup and receive data associated with the customer from a provider database (e.g., first party data), receive data associated with the customer from a service provider other than the provider (e.g., third party data), and receive physical data during the financial health checkup as described above. The processing circuit is configured utilize one or more of the first party data, third party data, or the physical data to determine a present financial health of the customer. Additionally, the processing circuit is configured determine a predicted financial health of the customer based on one or more of the first party data, third party data, or the physical data.

For example, the processing circuit may receive audio data from one of the various interfaces (e.g., a microphone) that includes a conversation between a customer and a provider employee. The processing circuit may determine a present financial health of the customer or a predicted financial health of the customer based on the audio data, data from a provider associated with the smart table, and data from another provider.

Referring to FIG. 1A, a block diagram of a smart table system 100 is shown, according to potential embodiments. The smart table system 100 includes a provider computing system 102 associated with a provider, such as a service provider, bank, or financial institution. The smart table system 100 further includes one or more user devices (e.g., user device 104), one or more smart tables (e.g., smart table 106), and a branch computing system 108 (e.g., a computing system of a branch location of the FI). In some embodiments, the provider computing system 102, user device 104 (as well as any additional user devices), smart table 106 (and any additional smart tables), and branch computing system 108 are directly communicably coupled. In some embodiments, the components of smart table system 100 may be communicably and operatively coupled to each other over a network, such as network 154, that permits the direct or indirect exchange of data, values, instructions, messages, and the like (represented by the double-headed arrows in FIG. 1). The network 154 may include one or more of a cellular network, the Internet, Wi-Fi, Wi-Max, a proprietary provider network, a proprietary retail or service provider network, and/or any other kind of wireless or wired network.

Each system or device in smart table system 100 may include one or more processors, memories, network interfaces and user interfaces. The memory may store programming logic that, when executed by the processor, controls the operation of the corresponding computing system or device. The memory may also store data in databases. For example, memory 142 may store programming logic that when executed by processor 140 within processing circuit 138, causes employee database 144 to update information for an employee account with communications received from a user device 104. The network interfaces (e.g., network interface 110 of provider computing system 102) may allow the computing systems and devices to communicate wirelessly or otherwise. The various components of devices in smart table system 100 may be implemented via hardware (e.g., circuitry), software (e.g., executable code), or any combination thereof. Devices and components in FIG. 1 can be added, deleted, integrated, separated, and/or rearranged in various embodiments of the disclosure.

The provider computing system 102 may be managed by a provider, such as a credit card issuer, a consultant, a retailer, a service provider, and/or the like. The provider computing system 102 includes a network interface 110, a processing circuit 112, and an input/output device 122. The network interface 110 is structured and used to establish connections with other computing systems and devices (e.g., the user devices 104, the smart tables 106, the branch computing system 108, etc.) via the network 154. The network interface 110 includes program logic that facilitates connection of the provider computing system 102 to the network 154. For example, the network interface 110 may include any combination of a wireless network transceiver (e.g., a cellular modem, a Bluetooth transceiver, a WiFi transceiver, etc.) and/or a wired network transceiver (e.g., an Ethernet transceiver). In some arrangements, the network interface 110 includes the hardware and machine-readable media sufficient to support communication over multiple channels of data communication. Further, in some arrangements, the network interface 110 includes cryptography capabilities to establish a secure or relatively secure communication session in which data communicated over the session is encrypted.

The processing circuit 112 includes a processor 114, a memory 116, and a provider client application 120. The memory 116 may be one or more devices (e.g., RAM, ROM, Flash memory, hard disk storage) for storing data and/or computer code for completing and/or facilitating the various processes described herein. The memory 116 may be or include non-transient volatile memory, non-volatile memory, and non-transitory computer storage media. Memory 116 may include database components, object code components, script components, or any other type of information structure for supporting the various activities and information structures described herein. Memory 116 may be communicably coupled to the processor 114 and include computer code or instructions for executing one or more processes described herein. The processor 114 may be implemented as one or more application specific integrated circuits (ASICs), field programmable gate arrays (FPGAs), a group of processing components, or other suitable electronic processing components. As such, the provider computing system 102 is configured to run a variety of application programs and store associated data in a database of the memory 116 (e.g., customer account database 118). One such application may be the provider client application 120.

The memory 116 may store a customer account database 118, according to some embodiments. The customer account database 118 may be configured to store updated personal information for customer accounts associated with the provider (e.g., the FI). For example, the customer account database 118 saves personal user information, such as name, age, gender, address, education, occupation, etc., customer preferences, such as notification preferences, security preferences, etc., and authentication information, such as customer passwords, biometric data for the customer, geometric information (e.g., latitude, longitude), etc. In some embodiments, the customer account database 118 includes a token vault that stores an associated customer token and/or device token for each customer account. The customer account database 118 may further be configured to store data for each customer account including financial data such as past transactions, different provider account information (e.g., balances, debt, type of account, etc.), investments, loans, mortgages, and so on.

In some embodiments, the provider client application 120 may be incorporated with an existing application in use by the provider computing system 102 (e.g., a mobile provider application, a service provider application, etc.). In some embodiments, the provider client application 120 is a separate software application implemented on the provider computing system 102. The provider client application 120 may be downloaded by the provider computing system 102 prior to its usage, hard coded into the memory 116 of the provider computing system 102, or be a network-based or web-based interface application such that the provider computing system 102 may provide a web browser to access the application, which may be executed remotely from the provider computing system 102. Accordingly, the provider computing system 102 may include software and/or hardware capable of implementing a network-based or web-based application. For example, in some instances, the provider client application 120 includes software such as HTML, XML, WML, SGML, PHP (Hypertext Preprocessor), CGI, and like languages.

In the latter instance, a user (e.g., a provider employee) may have to log onto or access the web-based interface before usage of the application. In this regard, the provider client application 120 may be supported by a separate computing system (e.g., user device 104) including one or more servers, processors, network interface, and so on, that transmit applications for use to the provider computing system 102.

In certain embodiments, the provider client application 120 includes an application programming interface (API) and/or a software development kit (SDK) that facilitate the integration of other applications with the provider client application 120. For example, the provider client application 120 is configured to utilize the functionality of the branch computing system 108 by interacting with the branch client application 150 through an API.

Still referring to FIG. 1, the input/output device 122 is structured to receive communications from and provide communications to provider employees associated with the provider computing system 102. The input/output device 122 is structured to exchange data, communications, instructions, etc. with an input/output component of the provider computing system 102. In one embodiment, the input/output device 122 includes communication circuitry for facilitating the exchange of data, values, messages, and the like between the input/output device 122 and the components of the provider computing system 102. In yet another embodiment, the input/output device 122 includes machine-readable media for facilitating the exchange of information between the input/output device and the components of the provider computing system 102. In yet another embodiment, the input/output device 122 includes any combination of hardware components, communication circuitry, and machine-readable media.

In some embodiments, the input/output device 122 includes suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output device 122 may provide an interface for the user to interact with various applications (e.g., the provider client application 120) stored on the provider computing system 102. For example, the input/output device 122 includes a keyboard, a keypad, a mouse, joystick, a touch screen, a microphone, a biometric device, a virtual reality headset, smart glasses, and the like. As another example, input/output device 122, may include, but is not limited to, a television monitor, a computer monitor, a printer, a facsimile, a speaker, and so on.

The branch computing system 108 similarly includes a network interface 136, a processing circuit 138, and an input/output device 152. The network interface 136, the processing circuit 138, and the input/output device 152 may function substantially similar to and include the same or similar components as the components of provider computing system 102, such as the network interface 110, the processing circuit 112, and the input/output device 122, described above. As such, it should be understood that the description of the network interface 110, the processing circuit 112, and the input/output device 122 of the provider computing system 102 provided above may be similarly applied to the network interface 136, the processing circuit 138, and the input/output device 152 of the branch computing system 108.

For example, the network interface 136 is similarly structured and used to establish connections with other computing systems (e.g., the provider computing system 102, the user devices 104, and/or the smart tables 106) via the network 154. The network interface 136 may further include any or all of the components discussed above, with reference to the network interface 110.

The processing circuit 138 similarly includes a processor 140 and a memory 142. The processor 140 and the memory 142 are substantially similar to the processor 114 and the memory 116 described above, with reference to the provider computing system 102. In some embodiments, the memory 142 includes an employee database 144 and a smart table database 146. The employee database 144 may be structured to store data concerning each employee associated with the branch location. In some embodiments, the employee database 144 may store data regarding an identification number, a job position, authorization information, contact information, a schedule, customer history, work history, an associated user device 104, credentials, and so forth, of an employee that works at the branch location associated with the branch computing system 108. For example, the employee database 144 may save biometric information (e.g., a fingerprint scan, an eye scan, a voice memo, etc.) and a password (e.g., PIN, alphanumeric code, QR code, barcode, etc.) for each employee at the branch location. As another example, the employee database 144 stores security and data access rights for each employee that are utilized in conducting particular transactions (high-risk transactions, transactions with high-confidentiality customers, etc.).

Additionally, the employee database 144 may include the types of trainings each employee has received, the clearances (e.g., access) that each employee has obtained, a trustworthiness score for each employee, and any other pertinent information pertaining to each employee that may be used to determine the employees qualifications for performing various transactions and other tasks using a smart table 106.

The smart table database 146 may be structured to store data for each smart table 106 at the branch location. The smart table database 146 may save information regarding an identification number of each smart table 106, service history information (e.g., a last date a smart table was serviced for repairs and/or updates), transaction history information (e.g., number of customers that used the smart table 106), scheduling information (e.g., customers assigned to the smart table 106 for an upcoming smart table provider session, and/or power status (e.g., charging, operating on a low battery level, etc.). For example, the smart table database 146 may store a schedule of which customers will be using a particular smart table 106 at the branch location. Beneficially, this may allow for branch managers to more effectively plan out smart table provider sessions and decrease the likelihood of scheduling conflicts, such as two customers having conflicting sessions at the same smart table 106.

The processing circuit 138 also is shown to include a smart table management circuit 148. In some embodiments, the smart table management circuit 148 is configured to receive new data (e.g., from the network 154) relating to employees and smart tables 106 at a branch location. The smart table management circuit 148 may then update a correct, corresponding database (e.g., employee database 144 or smart table database 146). In some embodiments, the smart table management circuit 148 is configured to receive requests from customers for an appointment at a smart table 106. The smart table management circuit 148 may then schedule the appointment based on what the client wants to accomplish during the provider session (e.g., to ensure the assigned smart table 106 has the necessary capabilities, such as a functional cash dispenser, credit card printer, check depositor, biometric authenticator, and so on) and the available smart tables 106 during a time slot desired by the customer.

The smart table management circuit 148 may also be configured to identify which employees may be needed (e.g., based on experience and/or access) at a smart table 106 in order to conduct a planned transaction with a customer during a provider session. For example, in generating a request for a smart table provider session, a customer may be asked (e.g., via the user device 104 associated with the customer) what type of transaction or provider task does the customer want to complete during the smart table session. In some embodiments, the smart table management circuit 148 may generate and transmit a notification to user device 104 of an employee that a new smart table provider session, assigned to the employee, has been scheduled.

Although the employee database 144, smart table database 146, and smart table management circuit 148 are shown as being a part of the branch computing system 108, these components may alternatively be a part of the provider computing system 102 and/or integrated into one or more smart tables 106. In some embodiments, each of the provider computing system 102 and the branch computing system 108 may include a corresponding smart table management circuit the same as or similar to the smart table management circuit 148.

The branch computing system 108 is similarly structured as the provider computing system 102 to run a variety of application programs and store associated data in a database of the memory 142. One such application may be the branch client application 150, for example.

The branch client application 150 may be substantially similar to the provider client application 120, but may instead be tailored toward branch employees or a branch manager at the branch location. For example, branch client application 150 is structured to generate user interfaces to display on a smart table 106 to facilitate improved customer experiences and employee interactions during an established provider session. Particularly, the branch client application 150 is configured to communicate with the provider computing system 102, the user devices 104 (e.g., customer user devices and employee user devices), and smart tables 106 to receive instructions or documents from the provider computing system 102 and/or the branch computing system 108 to complete specific tasks during a provider session at a smart table 106. Furthermore, the branch client application 150 may be configured to communicate reminders to user devices 104 of employees regarding upcoming provider sessions at a smart table 106 and/or ongoing provider sessions at a smart table 106 to perform a task associated with the provider session. For example, the branch client application 150 may be configured to generate a reminder for a branch employee to prepare a smart table 106 for an upcoming provider session. Accordingly, the branch client application 150 is communicably coupled to the provider computing system 102 (e.g., through interactions with the provider client application 120), the user devices 104 (e.g., through interactions with the user client application 132), and the smart tables 106 (e.g., through interactions with the smart table client application 218 (FIG. 2A)).

The branch client application 150 may thus communicate with the provider computing system 102, the user devise 104, and the smart tables 106 to perform a variety of functions. For example, the branch client application 150 is configured to reset a display of a smart table 106 (e.g., reset a display to a generic welcome display or sleep mode display) at the end of a provider session with a customer. As such, the branch client application 150 allows for a branch manager and branch employees associated with the branch location to monitor and update user interfaces of the smart tables 106 before, during, and after provider sessions with one or more customers paired to one of the smart tables 106.

The input/output device 152 may function substantially similarly to and include the same or similar components as the input/output device 122 described above, with reference to the provider computing system 102. Accordingly, it will be understood that the description of the input/output device 122 described above may also be applied to the input/output device 152 of the branch computing system 108. As an example, the input/output device 152 is similarly structured to receive communications from and provide communications to user devices 104 of branch employees and/or the branch manager associated with the branch computing system 108.

The smart table system 100 also includes one or more user devices 104, according to some embodiments. The user devices 104 may be a variety of suitable user computing devices. For example, the user devices 104 may comprise mobile phones. In some embodiments, the user devices 104 include personal computers (e.g., desktop computers or laptop computers), tablets, smart watches or other wearable devices (e.g., rings, jewelry, headsets, bands), smart glasses, headphones, smart vehicle voice/touch command systems, virtual/augmented reality (VR/AR) systems (e.g., smart glasses), appliances, internet of things (IoT) devices, voice assistants, at-home touch screen display systems, and/or any other suitable user computing devices capable of accessing and communicating using local and/or global networks (e.g., the network 154). The user devices 104 may be associated with employees or with customers of the provider (e.g., customers at the FI). As such, the customer account database 118 may be further configured to store device information concerning each user device 104 associated with a customer of the provider. Similarly, the employee database 144 may be further configured to store device information pertaining to each user device 104 of an employee at a branch location. For example, the device information may include a device form (e.g., the type of user device 104), a set of device capabilities (e.g., types of input/output devices, device mobility, operating system, installed applications, camera capabilities, device communication capabilities, and so on), device location information (e.g., geolocation data such as, latitude and longitude information), and/or device identification and authentication information (e.g., an encrypted device token for each user device 104, user authentication information, such as a PIN or biometric data, associated with each user device 104, etc.).

The user devices 104 may each similarly include a network interface 124, a processing circuit 126, and an input/output device 134. The network interface 124, the processing circuit 126, and the input/output device 134 may be structured and function substantially similar to and include the same or similar components as the network interface 110, the processing circuit 112, and the input/output device 122 described above, with reference to the provider computing system 102. Therefore, it should be understood that the description of the network interface 110, the processing circuit 112, and the input/output device 122 of the provider computing system 102 provided above may be similarly applied to the network interface 124, the processing circuit 126, and the input/output device 134 of each of the user devices 104.

In some embodiments, the network interface 124 is similarly structured and used to establish connections with other computing systems (e.g., the provider computing system 102, the branch computing system 108, other user devices 104, and the smart tables 106) via the network 154. The network interface 124 may further include any or all of the components discussed above, with reference to the network interface 110.

The processing circuit 126 similarly includes a memory 130 and a processor 128. The memory 130 and the processor 128 are substantially similar to the memory 116 and the processor 114 described above. Accordingly, the user devices 104 are similarly configured to run a variety of application programs and store associated data in a database of the memory 130 (e.g., user device database 131). For example, the user devices 104 may be configured to run an application such as the user client application 132 that is stored in the user device database 131. In another example, the user devices 104 may be configured to store various user data, such as, but not limited to, personal user device information (e.g., names, addresses, phone numbers, contacts, call logs, installed applications, and so on), user device authentication information (e.g., username/password combinations, device authentication tokens, security question answers, unique client identifiers, biometric data (such as digital representations of biometrics), geographic data, social media data, application specific data, and so on), and user device provider information (e.g., token information, account numbers, account balances, available credit, credit history, exchange histories, and so on) relating to the various accounts.

The user client application 132 may be substantially similar to the provider client application 120, the branch client application 150, and the smart table client application 218 (FIG. 2A), but may instead be specifically tailored to the user associated with the user devices 104. For example, the user client application 132 is similarly structured to selectively provide displays and/or audio/visual communications to each user device 104 to allow for improved interactions between a customer and branch employees, branch managers, and provider employees.

Particularly, the user client application 132 is configured to communicate with the provider computing system 102, the branch computing system 108, and the smart tables 106 to facilitate user interactions with a smart table 106 during a provider session at a branch location. As such, the user devices 104 are communicably coupled to the provider computing system 102 (e.g., through interactions with the provider client application 120), the branch computing system 108 (e.g., through interactions with the branch client application 150), and the smart tables 106 (e.g., through interactions with the smart table client application 218 (FIG. 2A)).

The user client application 132 may therefore communicate with the provider computing system 102, the smart tables 106, and the branch computing system 108 to perform a variety of functions. For example, the user client application 132 is similarly configured to receive user inputs (e.g., via a user interface of the user device 104) to complete provider interactions during a user session with a smart table 106, depending on whether the individual associated with the user device 104 is an employee or a customer. Additionally, the user client application 132 is configured to output information to a display of the user device 104 regarding information on the provider interaction. For example, the user client application 132 is configured to generate a user interface to show graphics regarding a financial history of a customer.

The user client application 132 is further configured to allow for communication with the provider client application 120 to allow a user associated with the various user devices 104 to update account information and/or provide feedback during a provider session with a smart table 106. Accordingly, the user client application 132 facilitates effective communication with a branch manager, other branch employees, the provider employees, and/or other customers (e.g., during a provider session with two customers, such as a mother and daughter) during a connected session with a smart table 106.

The user client application 132 may also be structured to allow the user devices 104 to retrieve and submit documents, forms, and/or any type of necessary information to and/or from a smart table 106 during an established session, as required to complete certain financial tasks. In some instances, the user client application 132 may be configured to automatically retrieve and/or submit documents, forms, or other necessary information to and/or from a smart table 106 in response to the establishment of a secure connection to the smart table 106. In some embodiments, the user client application 132 may be configured to temporarily store the various documents, forms, and/or necessary information, which may then be selectively transmitted to the smart table 106 in response to a user input from a customer or employee (e.g., received via the input/output device 134).

In some embodiments, the user client application 132 may be configured to temporarily store the various documents, forms, and/or necessary information and then selectively transmit the various documents, forms, and/or necessary information to the smart table 106 in response to a customer's arrival at a branch location. For example, the user device 104 may automatically connect to the branch computing system 108 and/or the one or more smart tables 106 when the user device 104 is within range of a network or communication device associated with the branch computing system 104 and/or the one or more smart tables 106.

In some embodiments, a customer or employee may identify various levels of authority associated with each of the user devices 104. For example, in some implementations, a user may set a first user device 104 as a primary user device and a second user device 104 as a secondary user device. In some instances, there may be various approved users of the user devices 104, excluding the user, such as family members, caretakers, business partners for customers, or other branch employees, a branch manager, a supervising employee for employees at the branch location. As such, in some embodiments, a primary user device may have the authority to veto or cancel the actions taken by a secondary user device.

Furthermore, the user client application 132 may be configured to provide a device status for each user device 104 to the provider session management circuit 210 (FIG. 2A) of a smart table 106. The device status may include both a device location and an indication of whether the respective user device 104 is active (e.g., turned on, connected to the internet, active notifications, within a specific distance, communicating with a beacon, currently used, any combination, and so on). For example, the user client application 132 may be configured to automatically, periodically, and/or selectively provide geographical location information (e.g., latitude and longitude) to the provider session management circuit 210. Additionally, the user client application 132 may be configured to send the provider session management circuit 210 a notification and/or an update when a given user device 104 is active.

In some embodiments, a user device 104 may be considered active if, for example, the user device 104 is currently being used (e.g., by a customer or by an employee during a provider session with a smart table 106), a user has indicated that the provider computing system 102, the branch computing system 108, and/or the smart tables 106 are permitted to send/retrieve data to/from the user device 104, and/or the user device 104 is within a predetermined distance from the branch computing system 108 or one of the smart tables 106. In some embodiments, there may be additional manners in which the user device 104 may be considered active.

The input/output device 134 of each user device 104 may function substantially similar to and include the same or similar components as the input/output device 122 previously described, with reference to the provider computing system 102. As such, it should be understood that the description of the input/output device 122 provided above may also be applied to the input/output device 134 of each of the user devices 104. In some embodiments, the input/output device 134 of each user device 104 is similarly structured to receive communications from and provide communications to a user (e.g., customer or employee) associated with the plurality of user devices 104.

For example, the input/output device 134 may include one or more user interfaces, which may include one or more biometric sensors (such as an iris scanner, a fingerprint scanner, a heart monitor that identifies cardiovascular signals, etc.). The input/output device 134 may also include components that provide perceptible outputs (such as displays and light sources for visually-perceptible elements, a speaker for audible elements, and haptics for perceptible signaling via touch, etc.) and/or that permit the user to enter inputs (such as a stylus or force sensor for detecting pressure on a display screen). One or more user devices 104 may include one or more locations sensors to allow the user devices 104 to detect its location relative to other physical objects (e.g., a smart table 106 or other user devices) or geographic locations. Example locations sensors may include global positioning system (GPS) devices and other navigation and geolocation devices, digital compasses, gyroscopes and other orientation sensors, as well as proximity sensors or other sensors that permit the user device 104 to determine the presence and relative distance of nearby devices, objects, and/or locations.

Still referring to FIG. 1, the smart table system 100 includes one or more smart tables 106. The smart tables 106 may be tables of varying sizes integrated with cash handling endpoints. Furthermore, the smart tables 106 may provide a shared graphical user interface for various scenarios. In some embodiments, each of the smart tables 106 are associated with a smart table identifier, such as a numeric or alphanumeric code, to identify the respective smart table to the branch computing system 108, the provider computing system 102, and the user devices 104. For example, in response to walking into a lobby of a branch location for a scheduled provider session, a user device 104 associated with the customer may indicate to the customer which smart table 106 to go to in order to initiate the session. While described with regards to a FI, the smart tables 106 may be used in other scenarios. For example, the smart tables 106 may be used at a car dealership or car rental company, a hotel, a booking agent, and/or a medical office. The features of the smart tables 106 are described in greater detail below, with reference to FIGS. 2A and 2B.

Still referring to FIG. 1A, The smart table system 100 includes a third party computing system 180 associated with a third party provider, such as a service provider, bank, or financial institution. The third party computing system 180 may be managed by a third party provider, such as a credit card issuer, a consultant, a retailer, a service provider, and/or the like. The third party computing system 180 includes a network interface 182, a processing circuit 184, and an input/output device 192. The network interface 182, the processing circuit 184, and the input/output device 192 may function substantially similar to and include the same or similar components as the components of provider computing system 102, such as the network interface 110, the processing circuit 112, and the input/output device 122, described above. As such, it should be understood that the description of the network interface 110, the processing circuit 112, and the input/output device 122 of the provider computing system 102 provided above may be similarly applied to network interface 182, the processing circuit 184, and the input/output device 192 of the third party computing system 180.

For example, the network interface 182 is similarly structured and used to establish connections with other computing systems (e.g., the provider computing system 102, the user devices 104, and/or the smart tables 106) via the network 154. The network interface 182 may further include any or all of the components discussed above, with reference to the network interface 110.

The processing circuit 184 similarly includes a processor 186 and a memory 187. The processor 186 and the memory 187 are substantially similar to the processor 114 and the memory 116 described above, with reference to the provider computing system 102. In some embodiments, the memory 187 includes a third party database 188. The third party database 188 may be structured to store data concerning personal information for customer accounts associated with the third party provider. For example, the third party database 188 saves personal user information, such as name, age, gender, address, education, occupation, etc., customer preferences, such as notification preferences, security preferences, etc., and authentication information, such as customer passwords, biometric data for the customer, geometric information (e.g., latitude, longitude), etc. In some embodiments, the third party database 188 includes a token vault that stores an associated customer token and/or device token for each customer account. The third party database 188 may further be configured to store data for each customer account including financial data such as past transactions, different provider account information (e.g., balances, debt, type of account, etc.), investments, loans, mortgages, insurance information, and so on.

The third party computing system 180 is configured to run a variety of application programs and store associated data in a database of the memory 178 (e.g., third party database 188). One such application may be the third party client application 190. The third party client application 190 may function substantially similar to and include the same or similar features as the as the provider client application 120, as described above. As such, it should be understood that the description of the provider client application 120 provided above may be similarly applied to the third party client application 190 of the third party computing system 180.

Figure 1B:
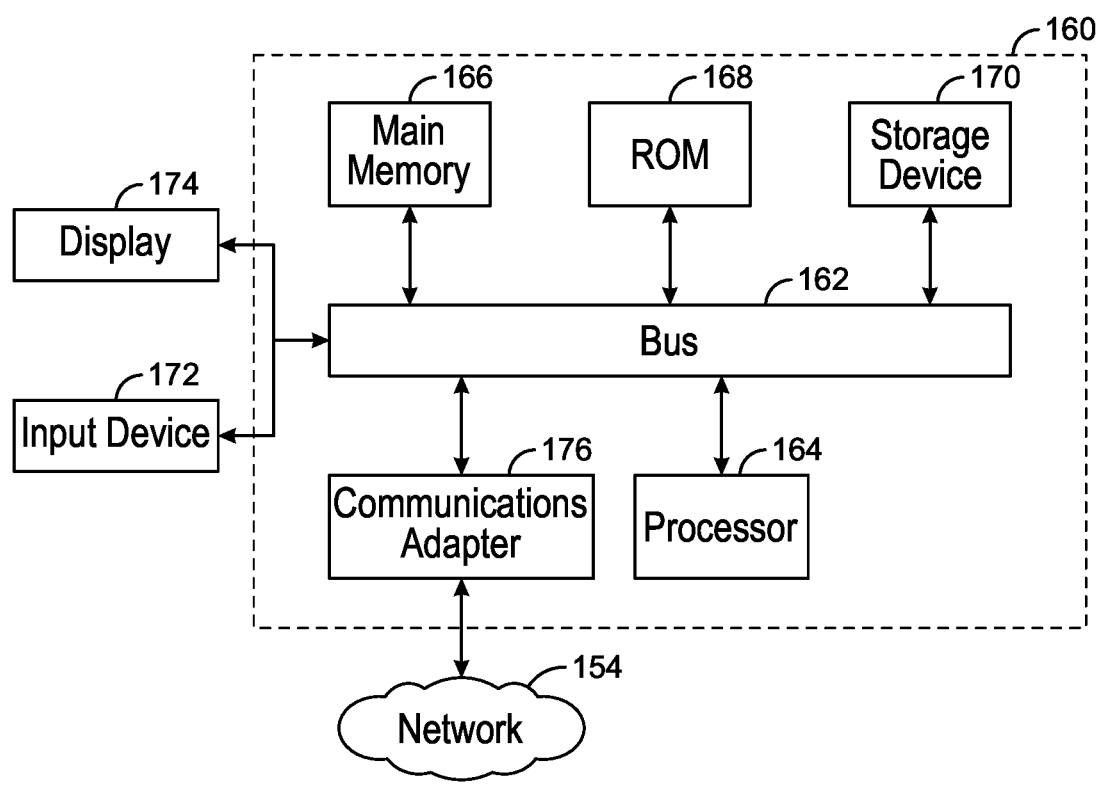
FIG. 1B is a block diagram illustrating an example computing system suitable for use in the various embodiments described herein.

FIG. 1B illustrates a depiction of a computer system 160 that can be used, for example, to implement a smart table system 100, provider computing system 102, user device 104, smart tables 106, branch computing system 108, third party computing system 180 and/or various other example systems described herein. The computing system 160 includes a bus 162 or other communication component for communicating information and a processor 164 coupled to the bus 162 for processing information. The computing system 160 also includes main memory 166, such as a random-access memory (RAM) or other dynamic storage device, coupled to the bus 162 for storing information, and instructions to be executed by the processor 164. Main memory 166 can also be used for storing position information, temporary variables, or other intermediate information during execution of instructions by the processor 164. The computing system 160 may further include a read only memory (ROM) 168 or other static storage device coupled to the bus 162 for storing static information and instructions for the processor 164. A storage device 170, such as a solid-state device, magnetic disk or optical disk, is coupled to the bus 162 for persistently storing information and instructions.

The computing system 160 may be coupled via the bus 162 to a display 174, such as a liquid crystal display, or active matrix display, for displaying information to a user. An input device 172, such as a keyboard including alphanumeric and other keys, may be coupled to the bus 162 for communicating information, and command selections to the processor 164. In another arrangement, the input device 172 has a touch screen display 174. The input device 172 can include any type of biometric sensor, a cursor control, such as a mouse, a trackball, or cursor direction keys, for communicating direction information and command selections to the processor 164 and for controlling cursor movement on the display 174.

In some arrangements, the computing system 160 may include a communications adapter 176, such as a networking adapter. Communications adapter 176 may be coupled to bus 162 and may be configured to enable communications with a computing or communications network 154 and/or other computing systems. In various illustrative arrangements, any type of networking configuration may be achieved using communications adapter 176, such as wired (e.g., via Ethernet), wireless (e.g., via WiFi, Bluetooth, and so on), satellite (e.g., via GPS) pre-configured, ad-hoc, LAN, WAN, and so on.

According to various arrangements, the processes that effectuate illustrative arrangements that are described herein can be achieved by the computing system 160 in response to the processor 164 executing an arrangement of instructions contained in main memory 166. Such instructions can be read into main memory 166 from another computer-readable medium, such as the storage device 170. Execution of the arrangement of instructions contained in main memory 166 causes the computing system 160 to perform the illustrative processes described herein. One or more processors in a multi-processing arrangement may also be employed to execute the instructions contained in main memory 166. In alternative arrangements, hard-wired circuitry may be used in place of or in combination with software instructions to implement illustrative arrangements. Thus, arrangements are not limited to any specific combination of hardware circuitry and software.

Although an example processing system has been described in FIG. 1B, arrangements of the subject matter and the functional operations disclosed herein can be carried out using other types of digital electronic circuitry, or in computer software (e.g., application, blockchain, distributed ledger technology) embodied on a tangible medium, firmware, or hardware, including the structures disclosed in this specification and their structural equivalents, or in combinations of one or more of them. Arrangements of the subject matter disclosed herein can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the arrangements of FIG. 1B as singular, stand-alone devices, one of ordinary skill in the art will appreciate that, in some arrangements, the computing system 160 may comprise virtualized systems and/or system resources. For example, in some arrangements, the computing system 160 may be a virtual switch, virtual router, virtual host, virtual server, etc. In various arrangements, computing system 160 may share physical storage, hardware, and other resources with other virtual machines. In some arrangements, virtual resources of the network 154 (e.g., network 154 of FIG. 1) may include cloud computing resources such that a virtual resource may rely on distributed processing across more than one physical processor, distributed memory, etc.

As used herein, the term "resource" refers to a physical or virtualized (for example, in cloud computing environments) computing resource needed to execute computer-based operations. Examples of computing resources include computing equipment or device (server, router, switch, etc.), storage, memory, executable (application, service, and the like), data file or data set (whether permanently stored or cached), and/or a combination thereof (for example, a set of computer-executable instructions stored in memory and executed by a processor, computer-readable media having data stored thereon, etc.).

Figure 2A:
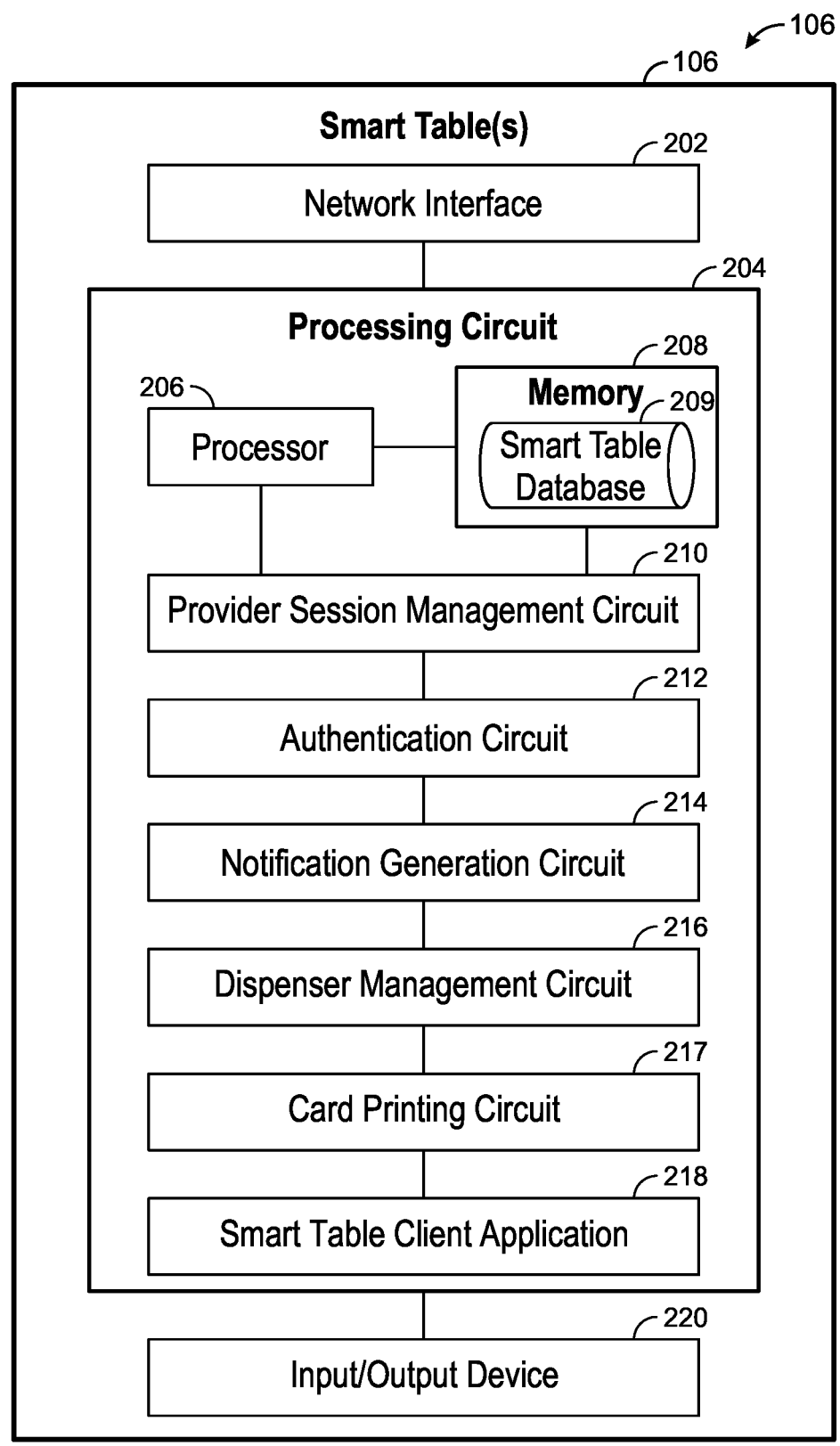
FIG. 2A is a block diagram of an embodiment of the smart table of FIG. 1, according to example embodiments.

Referring now to FIG. 2A, a block diagram of the smart tables 106 is shown, according to some embodiments. The smart tables 106 each similarly include a network interface 202, a processing circuit 204, and an input/output device 220. The network interface 202, the processing circuit 204, and the input/output device 220 may function substantially similar to and include the same or similar components as the network interface 110, the processing circuit 112, and the input/output device 122 described above, with reference to the provider computing system 102. Thus, it should be understood that the description of the network interface 110, the processing circuit 112, and the input/output device 122 of the provider computing system 102 provided above may be similarly applied to the network interface 202, the processing circuit 204, and the input/output device 220 of each of the smart tables 106.

For example, the network interface 202 is similarly structured and used to establish connections with other computing systems (e.g., the provider computing system 102, the branch computing system 108, the user devices 104) via the network 154. The network interface 202 may further include any or all of the components discussed above, with reference to the network interface 110.

The processing circuit 204 similarly includes a processor 206 and a memory 208. The processor 206 and the memory 208 are substantially similar to the processor 114 and the memory 116 described above. As such, the smart tables 106 are similarly configured to run a variety of application programs and store associated data in a database (e.g., smart table database 209) of the memory 208. For example, the smart tables 106 may be configured to run the application the smart table client application 218 that is stored in the smart table database 209. In another example, the smart tables 106 may be configured to store various provider and user data, such as, but not limited to, personal information (e.g., names, addresses, phone numbers, contacts, call logs, installed applications, and so on), authentication information (e.g., username/password combinations, device authentication tokens, security question answers, unique client identifiers), biometric data (such as digital representations of biometrics), geographic data, social media data, application specific data, and so on), and provider information (e.g., token information, account numbers, account balances, available credit, credit history, exchange histories, and so on) relating to the various users and/or various accounts.

The smart table client application 218 may be substantially similar to the provider client application 120 and the branch client application 150, but may instead be specifically for personalized provider sessions between customers and employees at the provider. For example, the smart table client application 218 is similarly structured to provide displays to each customer user device 104 to facilitate improved interactions between customers and specific branch employees associated with each smart table 106. Particularly, smart table client application 218 is configured to communicate with the provider computing system 102, the branch computing system 108, and the user devices 104 to receive instructions and notifications from the provider computing system 102 and/or the branch computing system 104 for the branch employees associated with each smart table 106 to perform various tasks associated with a provider session. Accordingly, the smart tables 106 are communicably coupled to the provider computing system 102 (e.g., through interactions with the provider client application 120), the branch computing system 108 (e.g., through interactions with the branch client application 150), and the user devices 104 (e.g., through interactions with the user client application 132), via a network (e.g., network 154).

The smart table client application 218 may therefore communicate with the provider computing system 102, the branch computing system 108, and the user devices 104 to perform several functions. For example, the smart table client application 218 is configured to receive data from the provider computing system 102 and/or the branch computing system 104 pertaining to necessary inputs for authenticating a particular transaction during a provider session. The smart table client application 218 is further configured to allow for communication with the provider client application 120 to allow the various branch employees that operate the smart tables 106 to provide questions or comments regarding any concerns with the smart tables. As such, the smart table client application 218 allows for the branch employees associated with the smart tables 106 to communicate with the customer, branch manager, and/or provider employees throughout the process of a provider session.

The input/output device 220 of each smart table 106 may function substantially similar to and include the same or similar components as the input/output device 134 described above, with reference to the user devices 104. Accordingly, it should be understood that the description of the input/output device 134 provided above may also be applied to the input/output device 220 of each of the smart tables 106. For example, the input/output device 220 of each smart table 106 is similarly structured to receive communications from and provide communications to customers paired (e.g., via a network connection, via Bluetooth, via a shared connection, and so on) with a smart table 106 and to the branch employee or branch employees associated with each smart table 106.

The processing circuit 204 also includes a provider session management circuit 210, an authentication circuit 212, a notification generation circuit 214, and a cash dispenser management circuit 216, for example. In some embodiments, the processing circuit 204 may contain more or less components than shown in FIG. 2A. The components of FIG. 2A are meant for illustrative purposes only, and should not be regarded as limiting in any manner. The provider session management circuit 210 may be configured to detect a trigger event for a provider session with the smart table 106. A provider session may include one customer (e.g., the smart table 106 is configured as a self-service ATM), a branch employee and a customer, a branch employee and more than one customer, and/or more than one branch employee and a customer, and/or more than one branch employee and more than one customer, according to some embodiments. For example, two customers that have a joint account together may participate in a provider session with a branch employee. In some embodiments, a trigger event includes detecting a user device 104 within a communication range of the smart table 106. In some embodiments, a trigger event includes the activation of a selectable icon on a graphical user interface of the smart table 106. In response to detecting a trigger event, the provider session management circuit 210 may be configured to send instructions to the notification generation circuit 214 to request input for customer and/or employee authentication and/or credential.

In some embodiments, the provider session management circuit 210 is further configured to receive sensor data from the input/output device 220 of the smart table 106. For example, the provider session management circuit 210 may be configured to receive camera data of documents that a customer wants to scan and save, movement data from a motion detector, temperature sensor data, audio data indicating a selection and/or action, haptic feedback indicating selection action, and so on. Additionally, the provider session management circuit 210 may determine when to send reminders to a user device 104 of the branch employee regarding a provider session (e.g., to fill out a certain form, an individual's stress level, elevated access, manager help, to pre-load a compartment of the smart table 106) and/or when to send a session end reminder for a scheduled provider session. For example, the provider session management circuit 210 may be configured to track how much time is remaining in a scheduled session to wrap up a provider interaction with the customer.

The authentication circuit 212 may be configured to determine whether a user is authenticated to initiate a provider session and/or to complete certain provider tasks. For example, the authentication circuit 212 may be configured to request an authorization approval from the provider computing system 102 of a received PIN or biometric input. In some embodiments, the authentication circuit 212 is also configured to determine the level of authentication necessary to complete different types of financial tasks (e.g., withdrawal cash, take out a loan, make a new investment, change address, request new debit card, etc.). The authentication circuit 212 may be configured to generate a score of how authenticated a user is during a provider session. For example, a user that entered both a biometric input and an alphanumeric passcode may receive a first score of 100% authenticated, and a user that only entered a PIN may receive a second score of 50% authenticated. The authentication circuit 212 is also configured to send instructions to the cash dispenser management circuit 216 in response to receiving an approved authorization (e.g., from the provider computing system via the network 154) to dispense cash to a customer for a withdrawal request.

The notification generation circuit 214 may be configured to create alerts regarding an upcoming provider session, an in-progress provider session, and/or a completed provider session, according to some embodiments. The notification generation circuit 214 may also receive instructions on the format of a notification from the provider session management circuit 210. In some embodiments, the notification generation circuit 214 is configured to instruct the input/output device 220 of the smart table 106 to provide audible and/or visual output to a customer regarding information displayed during a provider session. For example, the notification generation circuit 214 may be configured to cause an NFC icon on a graphical user interface of the smart table 106 to flash to indicate to a user to place a user device 104 on the NFC icon to pair to the smart table 106. As another example, the notification generation circuit 214 may be configured to generate a notification that outputs a voice-over indicating the provider session will terminate within a certain time interval, such as a five minute warning to complete any unfinished tasks.

Still referring to FIG. 2A, the cash dispenser management circuit 216 may be configured to control the use of the cash dispenser of the smart table 106. In some embodiments, the cash dispenser management circuit 216 is further configured to determine when the amount of available cash at the smart table 106 is below a threshold value (e.g., $100). The cash dispenser management circuit 216 may then instruct the notification generation circuit 214 to create a notification of the low amount of cash at the smart table 106 to the branch computing system 108 and/or a user device 104 (e.g., a branch manager user device 104). In some embodiments, the cash dispenser management circuit 216 is also configured to transmit an instruction to update a balance of the customer account to the provider computing system 102, for example, after the transaction request is completed. The cash dispenser management circuit 216 may further be configured to instruct the input/output device 220 of the smart table 106 to print a receipt with transaction details, such as the amount of cash withdrawn, the time of the completed transaction, and/or an updated balance for the customer account used to complete the transaction. In some embodiments, the receipt may include a summary of the provider session. The summary may include one or more graphics displayed on the smart table 106 during the provider session. The receipt may also include a scannable code (e.g., a QR code, etc.) configured to provide a web link to a summary of the provider session such that the customer can quickly access the summary, generated graphs, and/or recommendations from the provider session on a home device or smartphone after the provider session has ended by scanning the scannable code.

The card printing circuit 217 may be configured to control the use of the card printer of the smart table 106. In some embodiments, the card printing circuit 217 is further configured to determine various information for printing a card (e.g., debit card, credit card, rewards card, and so on). For example, a pseudo-random number (e.g., debit card number unique to an individual and/or a particular account of the individual) for the card may be generated by the card printing circuit 217. In another example, a design (e.g., color, artwork, templates) for the card may be determined based on a user preference and/or smart table 106 preference. In some embodiments, the card printing circuit 217 is also configured to transmit an instruction to update a card of the customer account to the provider computing system 102, for example, after a new card is printed. The card printing circuit 217 may further be configured to instruct the input/output device 220 of the smart table 106 to print a receipt with card details, such as the limit on the card, the name on the card, an updated card verification value (CVV), an updated PIN, and so on. The card printing circuit 217 may also be configured to print a reward card for the customer for their participation in the provider session or for an action taken during the provider session (e.g., provide a reward card if the customer paid off a debt, conducted a transaction, or set up a new account or signed up for a new feature during the provider session).

The use of the smart table 106 within the smart table system 100 may beneficially reduce significant amounts of time to complete provider interactions during a provider session and/or fill out paperwork forms. Furthermore, the smart tables 106 may help improve transparency of customer account information and employee services and increase face-to-face time with the branch employees. By providing a larger graphical user interface to share customer account information, rather than on a tiny screen on a single user device, the smart tables 106 also increase the amount of inclusion for each party participating in the provider session. The smart tables 106 may additionally help inform customers of several choices and advise the customers by displaying information from the branch employee regarding the customer account information utilizing visual tools. In some embodiments, the visual tools may include pie charts, bar graphs, scatterplots, user graphics, and so on. The smart tables 106 may be configured such that a customer sits while using, or may be configured such that a customer stands while using.

Figure 2B:
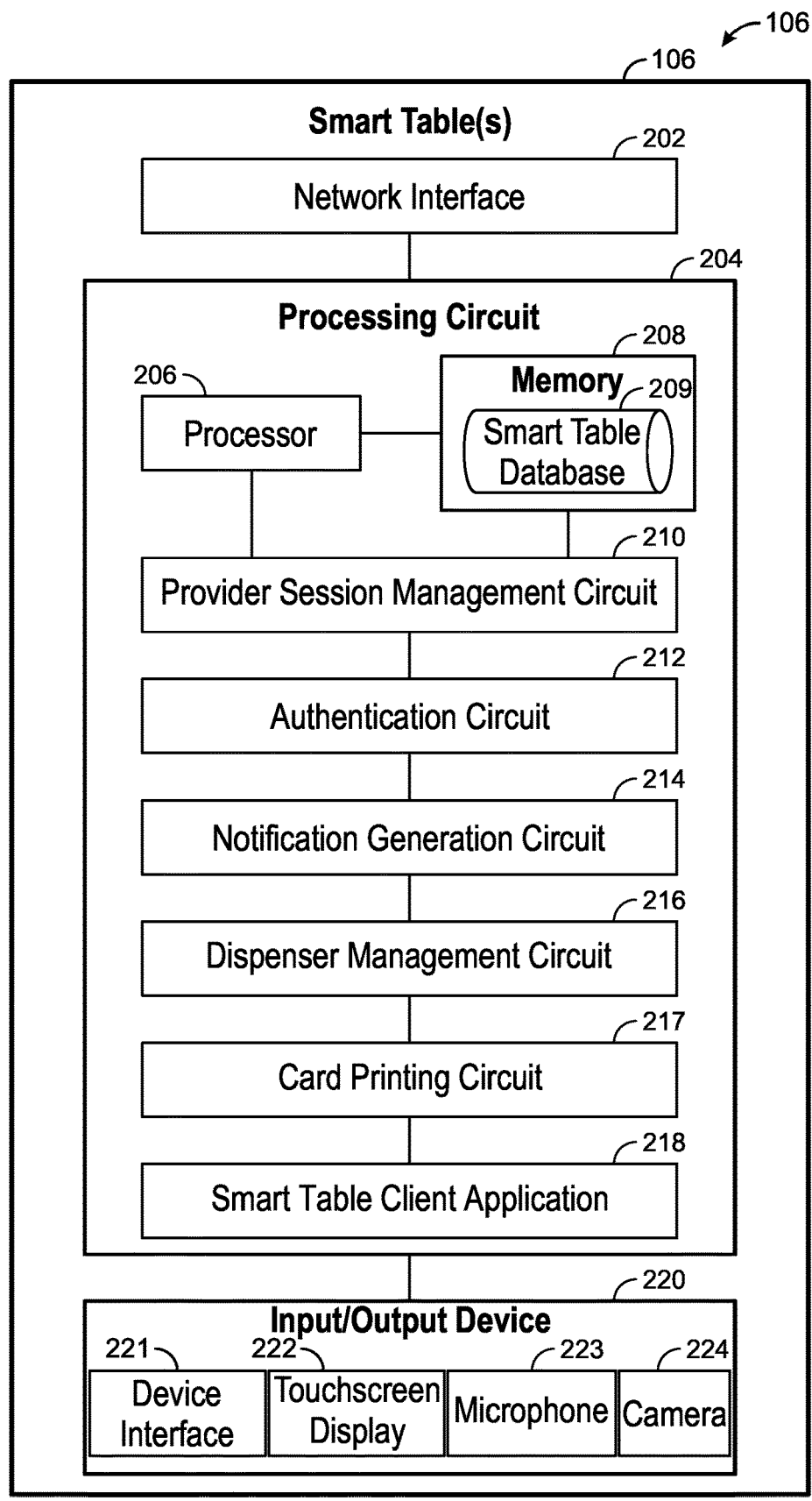
FIG. 2B is a block diagram of another embodiment of the smart table of FIG. 1, according to example embodiments.

Referring now to FIG. 2B, a block diagram of the smart tables 106 is shown, according to an exemplary embodiment. In the embodiment shown in FIG. 2B, the smart tables 106 may include some or all of the features of the smart tables 106 shown in FIG. 2A and described above. As shown in FIG. 2B, the input/output device 220 includes a device interface 221, an interactive touchscreen display 222, a microphone 223, or a camera 224.

The smart tables 106 include a communication device shown as device interface 221. The device interface 221 may be structured to directly or indirectly, via the network 154, interface with the user device 104. For example, the input/output device 220 may include a wireless device (e.g., Bluetooth, Wi-Fi, NFC, etc.) structured to interface with the network interface 124 of the user device 104. Alternatively, the device interface 221 may be structured to interface with the user device 104 through a wired connection. Additionally, the device interface 221 may be structured to provide power to the user device 104 through a physical connection or a wireless connection (e.g., electromagnetic induction).

The interactive touchscreen display 222 is configured to display a graphical user interface. The graphical user interface may be generated by the processing circuit 204 or a component thereof. The touchscreen display 222 is further configured to receive tactile input (e.g., touch input) from a user. For example, a user may press or tap on the touchscreen display 222 on a digital button that is part of the graphical user interface. The processing circuit 204 is configured to receive the tactile data of the user pressing the digital button from the touchscreen display 222 and adjust the graphical user interface accordingly.

The microphone 223 is configured to receive audio input from a user. In one embodiment, the microphone 223 may also convert an analog audio signal to a digital signal including the audio data. In an alternative embodiment, the analog audio signal may be converted to a digital signal by the processing circuit 204. In an exemplary embodiment, the microphone 223 is configured to receive audio input in the form of command words or phrases given by the user. The microphone 223 is also configured to receive audio input in the form of a conversation (e.g., a conversation between a customer and a team member of the provider).

The camera 224 may be configured to receive an image of the user. The image may include visual data from the user. For example, the image may include visual data associated with certain features of a user such as face of a user or a hand/body gesture performed by the user. The processing circuit 204 may receive the image from the camera 224 and facilitate interpretation of the image and/or visual data. For example, the processing circuit 204 may determine a mood of the user based on facial expressions or other visual factors. Additionally, the processing circuit may determine a motion based command input made by the user based on hand or body gestures performed by the user. For example, the camera 224 may capture multiple images and the processing circuit 204 may determine, based on the multiple images, a motion based command input.

In alternative embodiments, the input/output device 220 may be structured to communicate with external or third party interfaces. For example, one or more of the device interface 221, the interactive touchscreen display 222, the microphone 223, or the camera 224 may be external to the smart tables 106. In this example, the processing circuit 204 may receive data from the one or more interfaces external to smart tables 106 via the input/output device 220.

Figure 3:
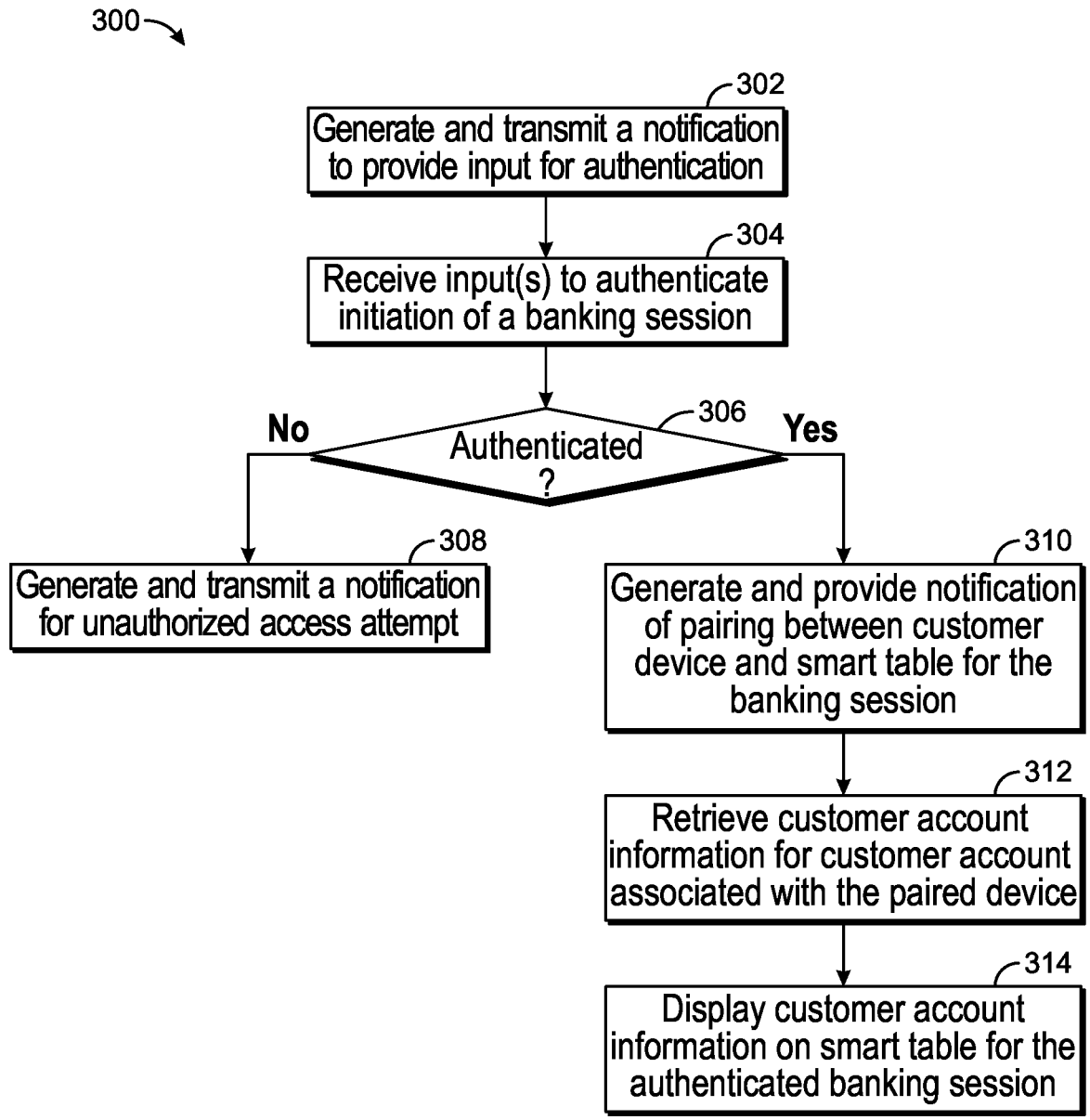
FIG. 3 is a flow diagram of a method for initiating a session with the smart table of FIG. 1, according to example embodiments.

Referring now to FIG. 3, a flow diagram of a method 300 for initiating a session between one or more user devices 104 and a smart table 106 is shown, according to some embodiments. The method 300 may be provided by and/or accessible by the provider client application 120, the branch client application 150, the user client application 132, and the smart table client application 218, for example. The method 300 may be performed by the smart table system 100 described above pertaining to FIGS. 1 and 2. In some embodiments, the method 300 begins in response to receiving, by a smart table 106, a session trigger event. A session trigger event may be any event that triggers the beginning of a session between the smart table 106 and a user device 104. For example, when a customer is within a certain proximity of the smart table 106, the user device 104 associated with the customer that the customer is holding may be within a wireless communication range of various devices (e.g., the branch computing system 108 and/or the smart table 106) associated with the branch location. In response to entering the wireless communication range, the respective user device 104 may be configured to automatically request the customer, via the user device 104, to enter confirmation to establish a secure connection with the smart table 106. As such, the security of the provider session may increase, as a customer may be required to be within a certain proximity (e.g., latitude and longitude) of the smart table 106 to begin the provider session. In some embodiments, similarly, a user device 104 of an employee scheduled to be running a provider session for the smart table 106 may also be required to be within proximity of the smart table 106 in order to initiate the provider session. A session trigger event may also include receiving an input via input/output device 220, such as receiving a user interaction via a touch screen display (e.g., touch screen display 174 of the smart table 106). In some embodiments, a session trigger event may include a customer or employee logging into a user client application 132 on a user device 104. In additional embodiments, a session trigger event may occur at a specific time, such as in response to the provider session management circuit 210 determining there is a scheduled provider session at a smart table 106 at a specific time. In some embodiments, the smart table 106 may be configured to operate in a low power mode or "sleep mode" until a session trigger event is received.

At 302, the method 300 includes generating and transmitting a notification to a customer device (e.g., a user device 104) to provide an input for authentication. In some embodiments, the notification generation circuit 214 is configured to execute step 302 in response to receiving an instruction from the provider session management circuit 210. The notification generation circuit 214 may be configured to generate a notification requesting user authentication based on information received, via the network 154, from the smart table management circuit 148 and customer account database 118. For example, specific smart tables 106 may require higher levels of authentication before a user may initiate a provider session based on the capabilities of the smart table. Additionally, the customer account database 118 may have stored customer preferences indicating one or more types of input the customer wants to use for authenticating a provider session. Input for authentication may include a personal identification number (PIN), a biometric input (e.g., a fingerprint, a palm print, an eye scan, a voice sample, etc.), a haptic device input (e.g., rings, jewelry, headsets, bands), smart glasses input, an alphanumeric passcode, a barcode, a QR code, a physical key, an electronic key (e.g., a token stored on the user device 104 of the customer), a physical or mobile wallet card (e.g., a credit card with chip technology, a virtual provider card), and so on. In some embodiments, the generated notification may include audible or tactile output when received by the user device 104. For example, in response to receiving the generated notification, the user device 104 may create an audible sound, via the input/output device 134, to catch the attention of the customer and/or an employee working with the customer and/or may cause the user device 104 to vibrate.

In some embodiments, instead of transmitting the notification to a user device 104, the notification requesting an input to authenticate the customer is shown on a display screen of the smart table 106. For example, the notification generation circuit 214 may generate a notification requesting a customer to place a palm on a highlighted area of the display screen of the smart table 106. As another example, the notification generation circuit 214 may provide a notification shown on the display screen of the smart table 106 asking a customer to enter a customer PIN on the customer's user device 104. In some embodiments, the generated notification also includes a message to place the user device 104 associated with the customer on a particular area of the smart table 106. For example, a highlighted area may indicate where to place the user device 104 in order to facilitate using near-field communication data exchange.

The input to authenticate initiation of a provider session is received at step 304. In some embodiments, the authentication circuit 212 is configured to receive the input to authorize initiating the provider session. One or more inputs may be received at step 304, according to some embodiments. For example, in some provider sessions, more than one customer may be detected and/or scheduled to participate in the provider session. As such, the authentication circuit 212 may receive inputs from each customer for the provider session. Additionally, an input to authenticate an employee scheduled to participate in the provider session may also be received at 304. For example, for provider sessions scheduled to conduct transactions with higher security, a branch manager may be required in order to initiate the provider session. As such, authentication inputs may be received from the customer and the branch manager at step 304.

In some embodiments, the inputs are received via the user devices 104 and transmitted to the smart table 106 via the network 154. In some embodiments, the one or more inputs may be received directly by the smart table 106 via the input/output device 220. For example, a PIN for authentication may be entered via a user interface of the customer's user device 104, or a fingerprint may be entered via the input/output device 220 (e.g., a fingerprint scanner) of the smart table 106. Beneficially, a customer may then enter personal authentication information in a more private setting, rather than entering personal authentication information on the smart table 106. As such, the security of the customer's personal information may be improved.

At step 306, the method 300 includes determining whether one or more users are authenticated to initiate the provider session. In some embodiments, the authentication circuit 212 is configured to determine whether authentication for the provider session is successful. The network interface 202 may transmit, via the network 154, the received input to the branch computing system 108 and/or the provider computing system 102. In some embodiments, the provider computing system 102 and/or the branch computing system 108 then determine whether the received input matches user information stored in a database (e.g., in customer account database 118, in employee database 144). For example, the provider computing system 102 determines whether a device token received from the user device 104 matches a token stored in a token vault of the customer account database 118. The network interface 202 may then receive confirmation or a denial of authentication for the one or more users (e.g., a customer, a customer and an employee, more than one customer, etc.). In some embodiments, the authentication circuit 212 is configured to execute step 316 at certain intervals throughout a provider session. For example, after a predetermined time interval, or at the end of a scheduled provider session, the authentication circuit 212 may be configured to re-authenticate the one or more customers and/or employee.

In response to determining one or more of the users were not authenticated, the method 300 proceeds to step 308. The method 300 includes generating and transmitting a notification for an unauthorized access attempt at step 308. In some embodiments, the notification generation circuit 214 is configured to execute the operations at 308. The notification generation circuit 214 may be configured to generate a text notification, an email notification, an automated voiceover notification, and/or any kind of alert to notify a user. The notification generation circuit 214 may be configured to include details concerning the access attempt in the generated notification. For example, the notification may include branch location information (e.g., name, address) and/or a timestamp of when the attempt to initiate a provider session was denied. In some embodiments, the notification also may include contact information for a branch manager and instructions concerning the security of a customer's personal data. For example, the generated notification may include options to view user account details, transaction history, previous provider session history, and so on. The generated notification may also include selectable options to change one or more inputs for authentication (e.g., change a user passcode, change a user PIN, print a new card, etc.) and/or user preferences (e.g., preferences for increased security before access is granted to customer information). In some embodiments, the notification is transmitted to a user device 104 associated with a customer. The notification may also be transmitted, via the network 154, to a user device 104 associated with a branch manager and/or an employee assigned to a scheduled provider session.

On the other hand, if the authentication circuit 212 determines at step 306 that the one or more users are successfully authenticated, the method 300 proceeds to step 310. At step 310, the method 300 includes generating and providing a notification of a successful pairing between customer device (e.g., user device 104) and the smart table 106 for the provider session. In some embodiments, the notification generation circuit 214 is configured to generate a text alert or email alert indicating the establishment of a secure communication session with the smart table 106. The type of generated notification (e.g., email, text, phone call, etc.) may be based on user preferences. For example, the provider session management circuit 210 may receive session preferences for a customer stored in customer account database 118. The provider session preferences may include the kind of notifications the customer wants to receive. The preferences may also include information on where to direct the generated notification. For example, customer preferences may include contact information (e.g., an email of a parent of the customer, a phone number, etc.) to send the generated notification. As such, in some embodiments, the notification may be provided to one or more user devices 104. The generated notification for a successful pairing between the customer user device 104 and the smart table 106 may also be provided via the input/output device 220 of the smart table 106. For example, the smart table 106 may show the notification on a display screen.

At step 312, the method 300 includes retrieving customer account information for the customer account associated with the pair customer user device 104. In some embodiments, the provider session management circuit 210 is configured to execute step 312. The provider session management circuit 210 may be configured to request, via the network interface 202, customer account information from the provider computing system 102. In some embodiments, the amount of customer account information retrieved is relative to the security of the provider session. For example, the customer account information retrieved is relative to the type of input received for user authentication. As an example, if only a passcode was entered, the customer account information that is retrieved may be more limited than if a passcode and a biometric input were entered to authenticate the customer. In some embodiments, customer account information may include previous provider session history, transaction history for the customer account, balances for various accounts (e.g., savings accounts, checking accounts, credit card accounts), loan information, mortgage information, personal information (e.g., name, address, age, education, occupation, salary, etc.), credit card debt, current investments, retirement plans, savings goals, and so on. The provider session management circuit 210 may also be configured to pull specific documents concerning planned transactions for a scheduled provider session at 312. For example, a prepared document regarding a loan may be retrieved at step 312 for a branch employee to review with the customer during the scheduled provider session.

Once the customer account information has been retrieved, at step 314, the customer account information may be displayed on the smart table 106 for the authenticated provider session. In some embodiments, the customer account information may be displayed in a customer area of a display screen of the smart table 106. In some embodiments, the customer account information may be displayed on the customer's user device 104 rather than on a display screen of the smart table 106. For example, for certain customer account information that is more confidential, such as a social security number, and/or customer account information that a customer indicated in preferences should not be shown during a provider session on a smart table, such as a salary or the customer's overall financial worth, the provider session management circuit 210 may be configured to only provide that information on the customer's user device 104. In some embodiments, the customer account information may be displayed using tables, graphics, and/or other visual tools to help convey the data to the customer in a meaningful manner. For example, concerning retirement, a graphic may show a portion of the customer's current earnings that should be set aside for retirement and the progress the customer has made in saving for retirement over a specific period of time.

According to various exemplary embodiments, the provider session management circuit 210 may be configured to trigger a provider session including one or more customers as described above. The provider session may be a financial health report or a financial health checkup relating to a financial health of the customer. The financial health of the customer may include past and planned data. For example, financial data including expenditures, investments, debts, etc. Additionally, the financial health may include official data such as a credit score or unofficial data such as an estimated value of the customer's investments. In one embodiment, the financial health of the customer may be determined by the provider session management circuit 210. In some embodiments, the financial health of the customer may be partially or wholly determined by processing circuit 204, the branch computing system 108, or the provider computing system 102.

According to an exemplary embodiment, the processing circuit 204 is configured generate a graphical user interface and provide the graphical user interface to the touchscreen display 222. The graphical user interface may include a graphic that depicts the financial health of the customer. The provider session management circuit 210 may update the financial health of the customer based on data received by the provider session management circuit 210. Accordingly, the processing circuit 204 may update the graphical user interface or the graphic depicting the financial health of the customer responsive to the provider session management circuit 210 updating the financial health of the customer. Additionally, the graphical user interface may include additional graphics and display them in various orientations. For example, a first graphic may be generated in a first orientation for a first user to view and a second graphic may be generated in a second orientation for a second user to view. The first graphic and the second graphic may be identical or different. Possible orientations are discussed with respect to FIG. 9. Additionally, the graphical user interface may be built in real-time based on at least one of a user input (e.g., an audio input or an image).

In some embodiments the financial health of the customer is at least partially determined based on customer data already held by the provider. For example, the customer may have a customer account associated with the provider. Data associated with the customer account (e.g., first party or in-house data) is stored on the customer account database 118. The provider session management circuit 210 is configured to receive the data associated with the customer account from the customer account database 118 via the network interface 124, the network 154, and the network interface 110. The provider session management circuit 210 is configured to at least partially determine the financial health of the customer based on the data associated with the customer account. In some embodiments, the customer may not have a customer account associated with the provider. In these embodiments, the financial health of the customer may be determined by other factors.

In some embodiments, the customer may have additional accounts not associated with the provider (e.g., loan accounts, checking accounts, savings accounts, etc. that are associated with a third party service provider) that are not accessible by the provider computing system 102. In these embodiments, the provider session management circuit 210 may be configured to interface with the user device 104 via the device interface 221 and gather data associated with a third party service provider. The provider session management circuit 210 may utilize a data scraping (e.g., screen scraping) method of gathering third party data. In some embodiments, the customer may authorize the provider session management circuit 210 to receive the third party data from the network 154. The provider session management circuit 210 is configured to update or at least partially determine the financial health of the customer based on the third party data.

In some embodiments, the financial health of the customer may be determined based on inputs received by the smart table 106 via the input/output device 220. Specifically, the provider session management circuit 210 may be configured to receive one or more of tactical data from the touchscreen display 222, audio data from the microphone 223, or visual data from the camera 224. For example, a customer may interact with the touchscreen display 222, and the graphical user interface thereon, to input tactile data. The provider session management circuit 210 receives the tactile data and updates or at least partially determines the financial health of the customer. Similarly, the user may input audio data via the microphone 223 including word/phrase commands and conversational data. The provider session management circuit 210 may identify key words or phrases within the conversational data relevant to the financial health of the user and update the financial health of the customer accordingly. Furthermore, the provider session management circuit 210 may receive visual data from the camera 224. In one embodiment, the provider session management circuit 210 may determine a mood of the customer based on the image and/or the visual data and update the financial health of the customer based on the mood of the customer. In an additional embodiment, the provider session management circuit 210 may detect hand or body gestures in the visual data and update the financial health of the customer accordingly.

According to an exemplary embodiment a customer may initiate a financial health checkup transaction at the smart table 106. The smart table 106 may prompt the customer to initiate a connection between the smart table 106 and the user device 140 associated with the customer via the graphical user interface as described above. The authentication circuit 212 may determine a level of authentication necessary to continue the financial health checkup and prompt the user to input the required authentication. The provider session management circuit 210 may begin determining and continuously update a financial health of the customer by receiving provider data (e.g., first party data), third party data, and input/output data as described above. The processing circuit 204 may continuously update the graphical user interface or the graphic depicting the financial health of the customer as the provider session management circuit 210 updates the financial health of the customer. For example, during a conversation with a provider team member, the customer may verbally indicate a plan for making a relatively large purchase in the near future. The provider session management circuit 210 may receive this indication, via the microphone 223, and update the planned or projected financial health of the customer to include various savings plans associated with the relatively large purchase. The processing circuit 204 may update the graphic depicting the financial health of the customer to include graphics or depictions of various saving plans associated with the relatively large purchase for the customer to view. The provider session management circuit 210 may detect, via the camera 224, that the mood of the user becomes unfavorable when viewing a certain saving plan. The provider session management circuit 210 may update the saving plans to improve the mood or favorability of the customer based on the certain savings plan that the user deemed unfavorable. The customer may end the financial health checkup transaction after reviewing the graphic depicting the financial health of the customer.

According to various exemplary embodiments, the provider session may include one or more of a loan agreement, an investment, a credit card for a customer, or a financial planning session. In these embodiments, the provider session management circuit 210 may be configured to update customer data and similarly to the financial health transaction described above. For example in a loan agreement transaction, the provider session management circuit 210 may determine the maximum loan amount, a loan rate (e.g., interest rate, APR, etc.) or other loan transaction details based on one or more of the provider data, third party data, and user data such as conversational data.

Figure 4:
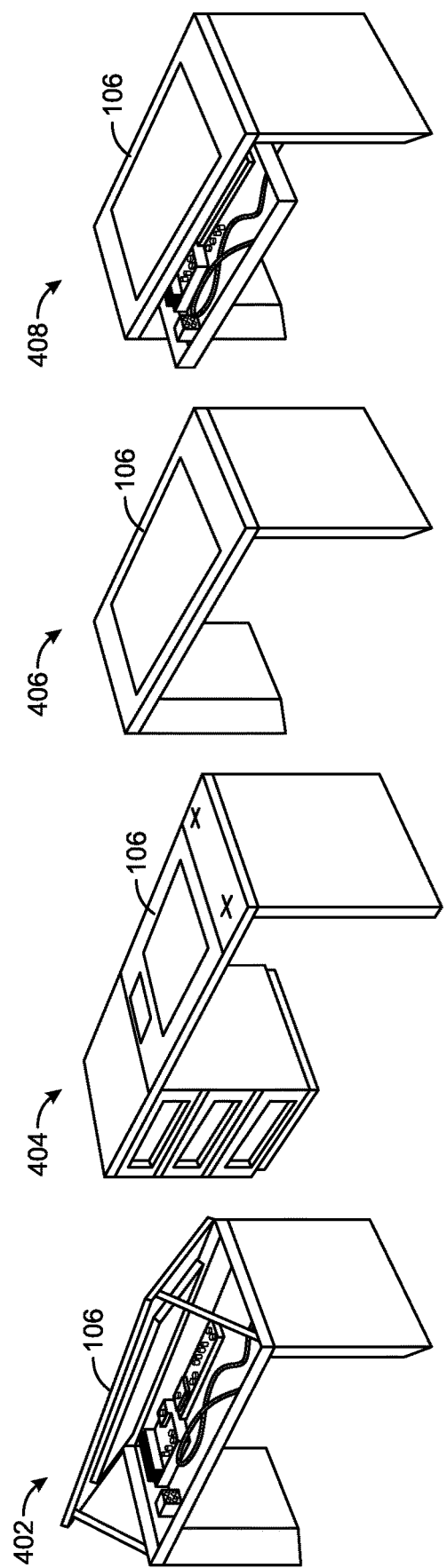
FIG. 4 is an illustration of various configurations of the smart table of FIG. 1, according to example embodiments.

Referring now to FIG. 4, an illustration of various configurations of the smart table 106 are shown, according to some embodiments. A perspective view 402 of a smart table 106 depicts a storage compartment beneath a top surface of the smart table 106. In some embodiments, the cash dispenser of the smart table 106 may be accessed by lifting a top surface of the smart table 106. As such, the cash dispenser may easily be serviced by lifting the top surface of the smart table 106, covering the storage compartment. In some embodiments, a storage compartment of the smart table 106 may be accessed by sliding the top surface to a side of the smart table 106, rather than lifting the top surface. A perspective view 404 of a smart table 106 shows an integration of storage compartments for the smart table 106 and a digitally enabled, touch screen display, according to some embodiments. A perspective view 406 of a smart table 106 depicts a touch screen display encompassing the top surface of the smart table 106. In some embodiments, the smart table 106 may not include a cash dispenser, as shown in perspective view 406. The views shown in FIG. 4 are meant to be illustrative in purpose only, and should not be regarded as limiting in any manner.

Figure 5:
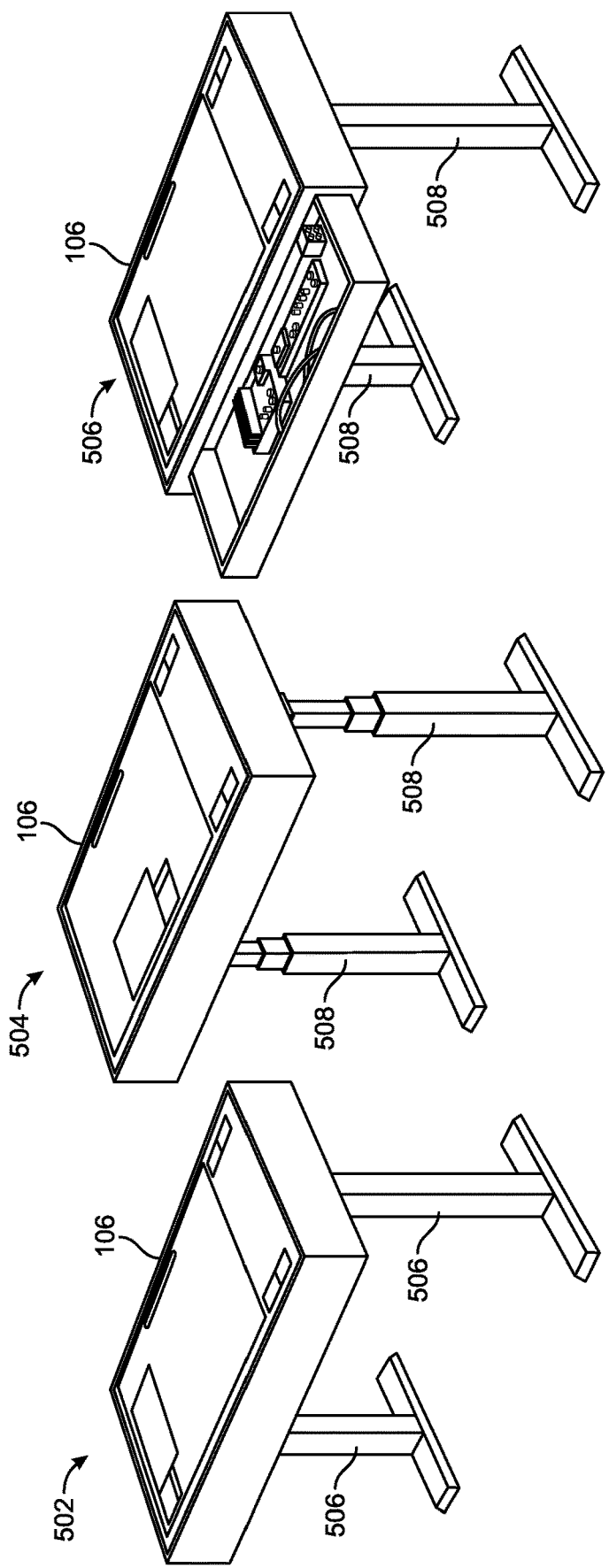
FIG. 5 is an illustration of additional configurations of the smart table of FIG. 1, according to example embodiments.

Referring now to FIG. 5, an illustration of additional configurations of the smart table is shown, according to some embodiments. Perspective view 502 depicts a smart table 106 with a touch screen display and legs 506 at a set height. Perspective view 504 shows a smart table 106 including a touch screen display and legs 508. In some embodiments, the legs 508 may be adjusted to varying heights based on user preference. For example, a user may increase or decrease the height of the smart table 106 by operating motorized lifting columns to increase or decrease the height of the legs 508. In some embodiments, the motorized lifting columns of the legs 508 are activated using a switch on the smart table 106. In some embodiments, the height of the smart table 106 is increased or decreased by entering an input via a touch screen of the smart table 106.

Figure 6:
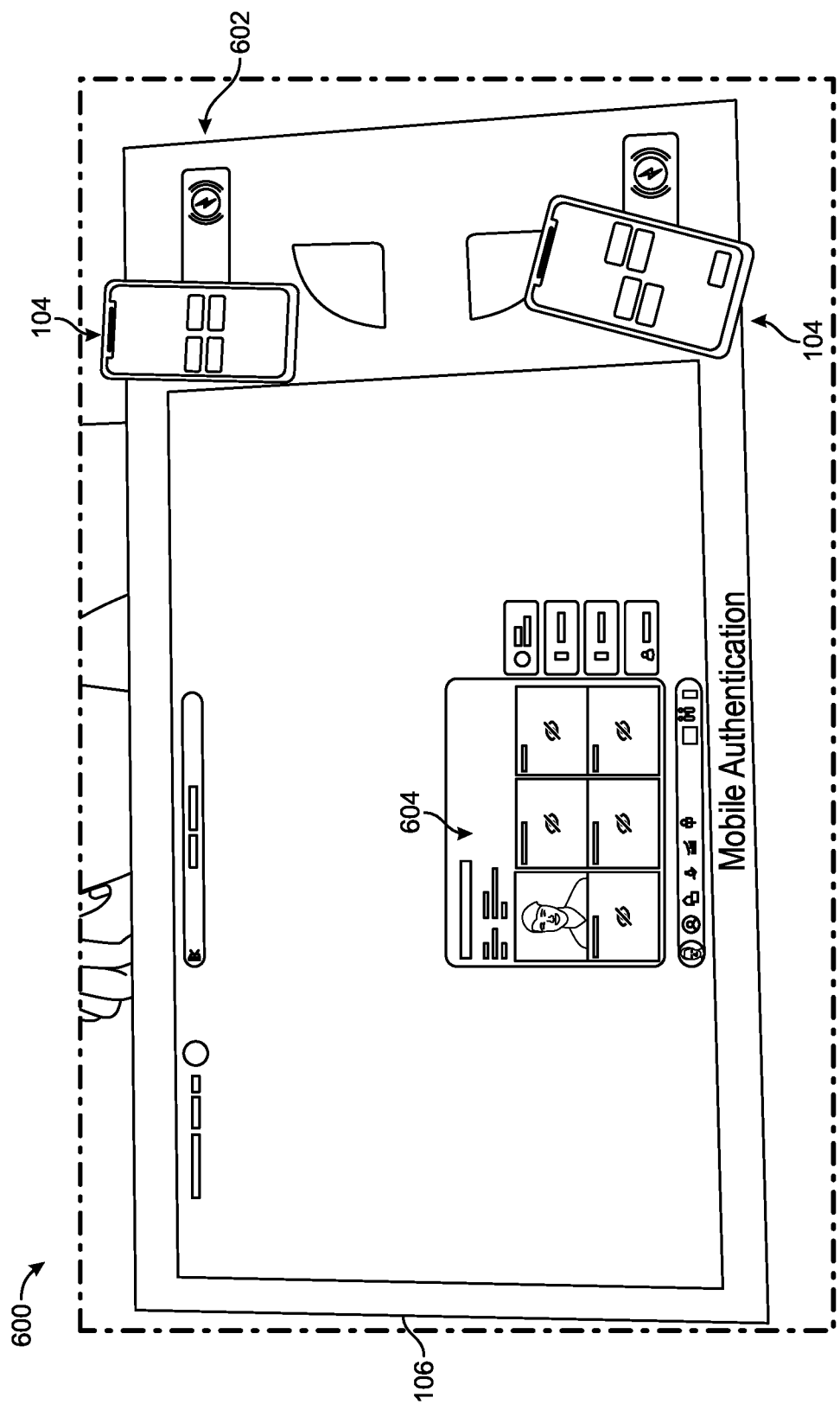
FIG. 6 is an illustration of a user interface of the smart table and paired user devices of FIG. 1, according to example embodiments.

Referring now to FIG. 6, an illustration of a user interface 600 of the smart table 106 and paired user devices 104 is shown, according to some embodiments. The user interface 600 may be provided by the smart table client application 218. In some embodiments, the user interface 600 is generated and displayed, via an input/output device 220, by the provider session management circuit 210. The user interface 600 includes account summary window 604, for example. The account summary window 604 may include a name, address, photo identification, and contact information for a customer. In some embodiments, the account summary window 604 is displayed in response to receiving a selection of a profile icon on the user interface 600. The user interface 600 also includes a device area 602. In some embodiments, the device area 602 includes a charging icon and a wireless connection icon. The connection icon may indicate to one or more users (e.g., a customer, two customers, a customer and an employee, etc.) where to place a user device 104 in order to pair to the smart table 106. As such, the connection icons shown on the user interface 600 may be used as indicators of the locations of NFC tags within the smart table 106. In some embodiments, the user interface 600 may utilize different colors to indicate a successful pairing and an unsuccessful pairing in device area 602. For example, the connection icon may turn green in response to a successful pairing to the respective user device 104 placed over the connection icon. Although FIG. 6 depicts two user devices 104, the smart table 106 may be configured to pair to more than two different user devices 104, according to some embodiments.

Figure 7:
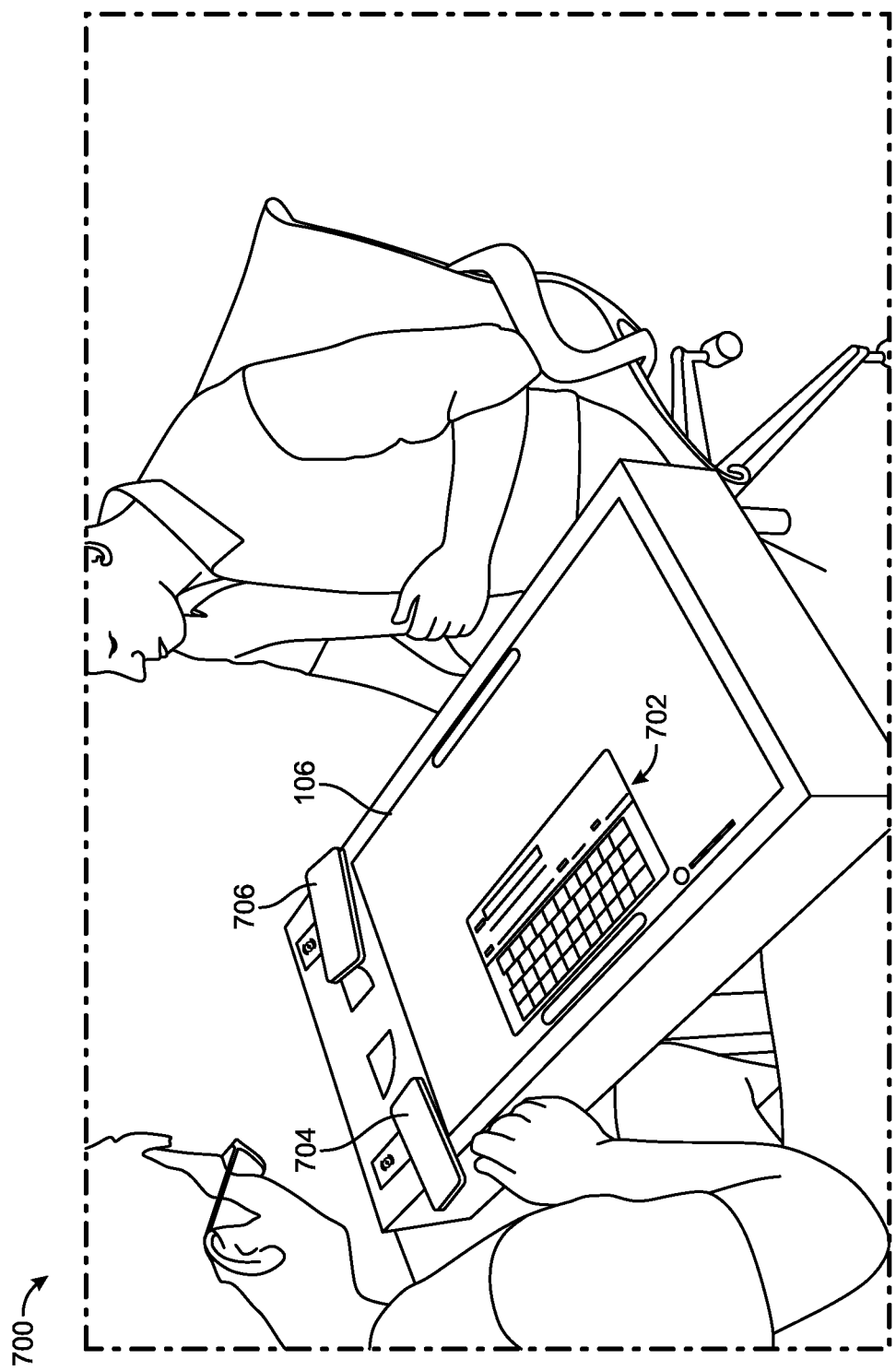
FIG. 7 is an illustration of a user interface of the smart table of FIG. 1 configured to receive an input from a customer or provider representative, according to example embodiments.

Referring now to FIG. 7, an illustration 700 of a user interface of the smart table 106 configured to receive an input from a customer or provider representative is shown, according to some embodiments. The illustration 700 depicts a keyboard 702, a customer device 704, and an employee device 706. The customer device 704 and the employee device 706 may both be the same or similar as the user devices 104 described above. In some embodiments, the keyboard 702 is displayed on a user interface of the smart table 106 to provide an input for the customer. The keyboard 702 may be displayed to enter new information, such as a change of address for the customer. In some embodiments, the keyboard 702 is oriented on a display screen of the smart table 106 based on whether a customer or an employee needs to enter information. For example, the smart table 106 may serve as a desk for a provider employee (e.g., a banker, lawyer, a consultant, a real estate agent). As such, while sitting down at the smart table 106, the customer and the branch employee may be seated on opposite sides of the smart table 106. In some embodiments, the input/output device 220 of the smart table 106 is configured to determine an orientation and position for the keyboard 702 based on data received from sensors and/or cameras of the smart table 106.

Figure 8:
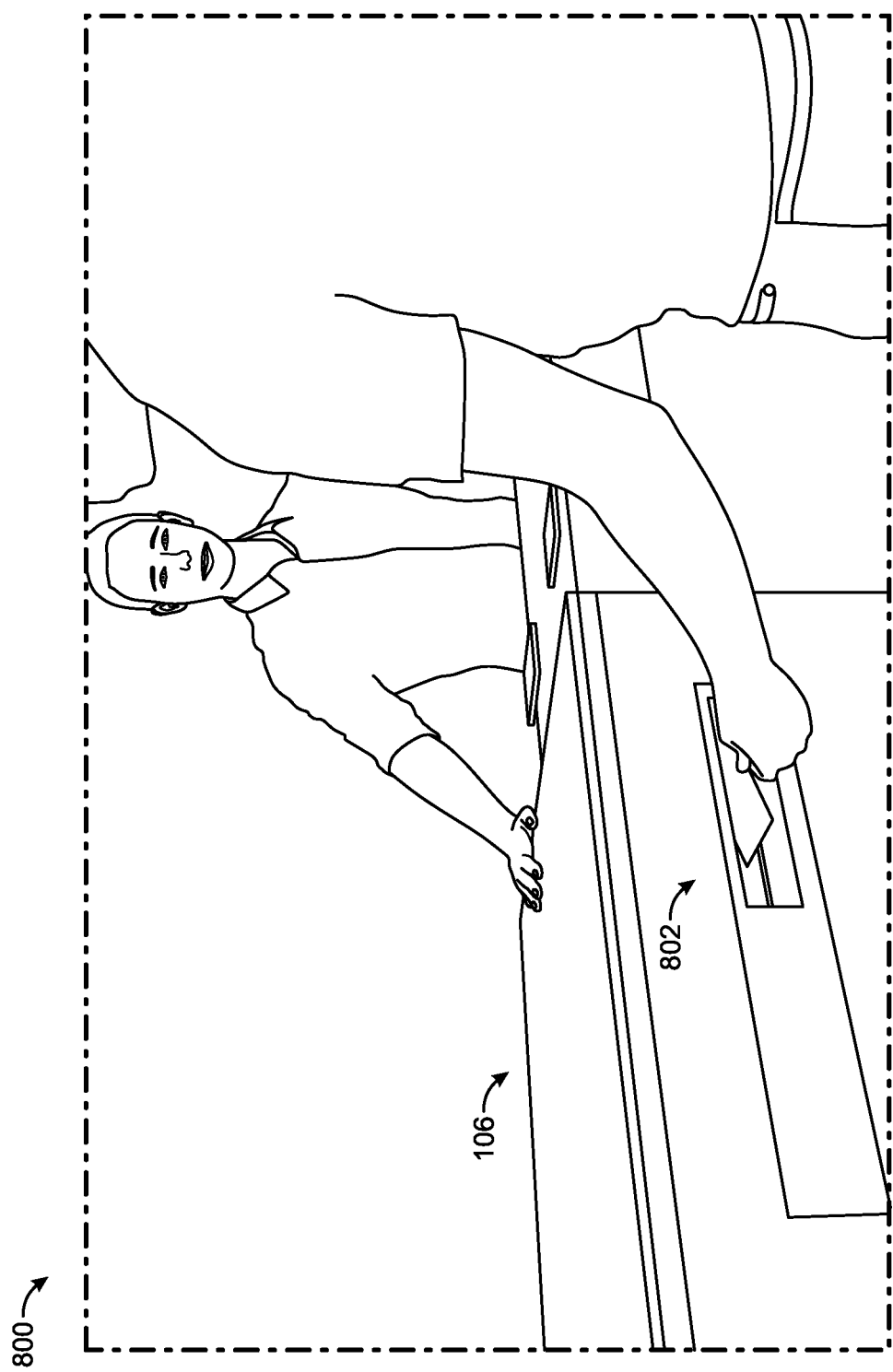
FIG. 8 is an illustration of the smart table of FIG. 1 including a dispensing mechanism, according to example embodiments.

Referring now to FIG. 8, an illustration 800 of the smart table 106 including a dispensing mechanism 802 is shown, according to some embodiments. The dispensing mechanism 802 can be a cash dispenser, though it will be appreciated that the dispensing mechanism 802 can be configured to dispense any type of item, such as cash, a receipt, checks, stamps, and so on. Accordingly, the smart table 106 may beneficially be utilized as an automated teller machine (ATM). In some embodiments, the smart table 106 may be used as an assisted-service ATM, as shown in FIG. 7. The smart table 106 may also function as a station for tellers at a branch location. In some embodiments, the smart table 106 may be used as a self-service ATM, without using employees to supervise the transaction at the smart table 106. The smart table 106 may be configured to pair with the user device 104 of the customer before dispensing cash via the dispensing mechanism 802. For example, the dispenser management circuit 216 is configured to receive approval from the authentication circuit 212 before providing cash to a customer using the smart table 106.

Figure 9:
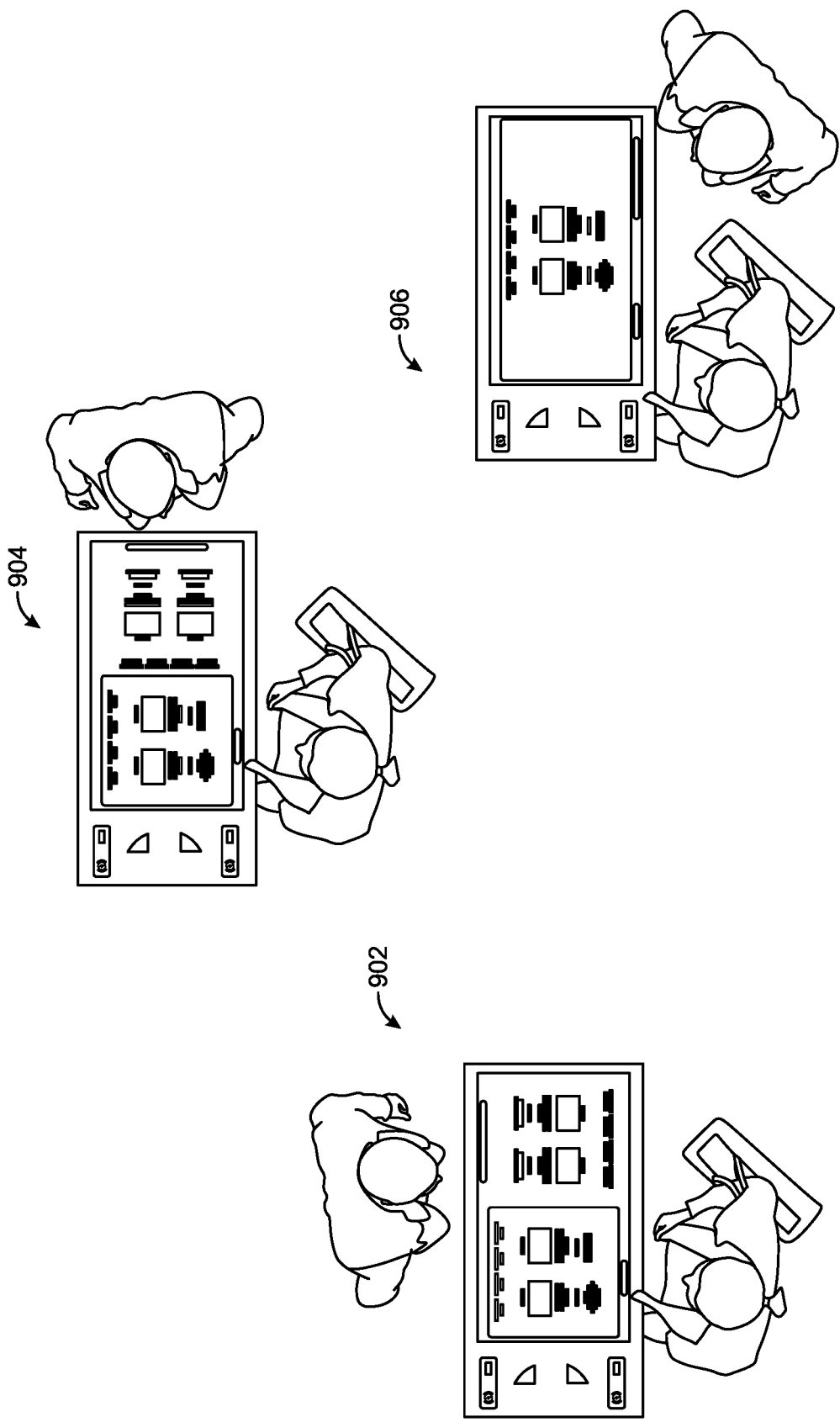
FIG. 9 is an illustration of various user interface orientations displayable by the smart table of FIG. 1, according to example embodiments.

Referring now to FIG. 9, an illustration 902 of various user interface orientations displayable by the smart table 106 is shown, according to some embodiments. A first user interface orientation 902 includes a user interface of a smart table 106 with half of a customer interface area and half of a branch employee interface area. In some embodiments, the branch employee interface area is rotated 180 degrees from the customer interface area in a traditional setting for when the branch employee is on an opposite side of the smart table 106 from the customer. A second user interface orientation 904 includes a user interface of the smart table 106 with the customer interface area and the branch employee interface area rotated 90 degrees from the customer interface area for a more casual setting. A third user interface orientation 906 includes a user interface of the smart table 106 with one interface area for both the customer and the branch employee. In some embodiments, the third user interface orientation 906 shows the customer interface area for when the customer and the branch employee are on the same side of the smart table 106, for example.

Figure 10:
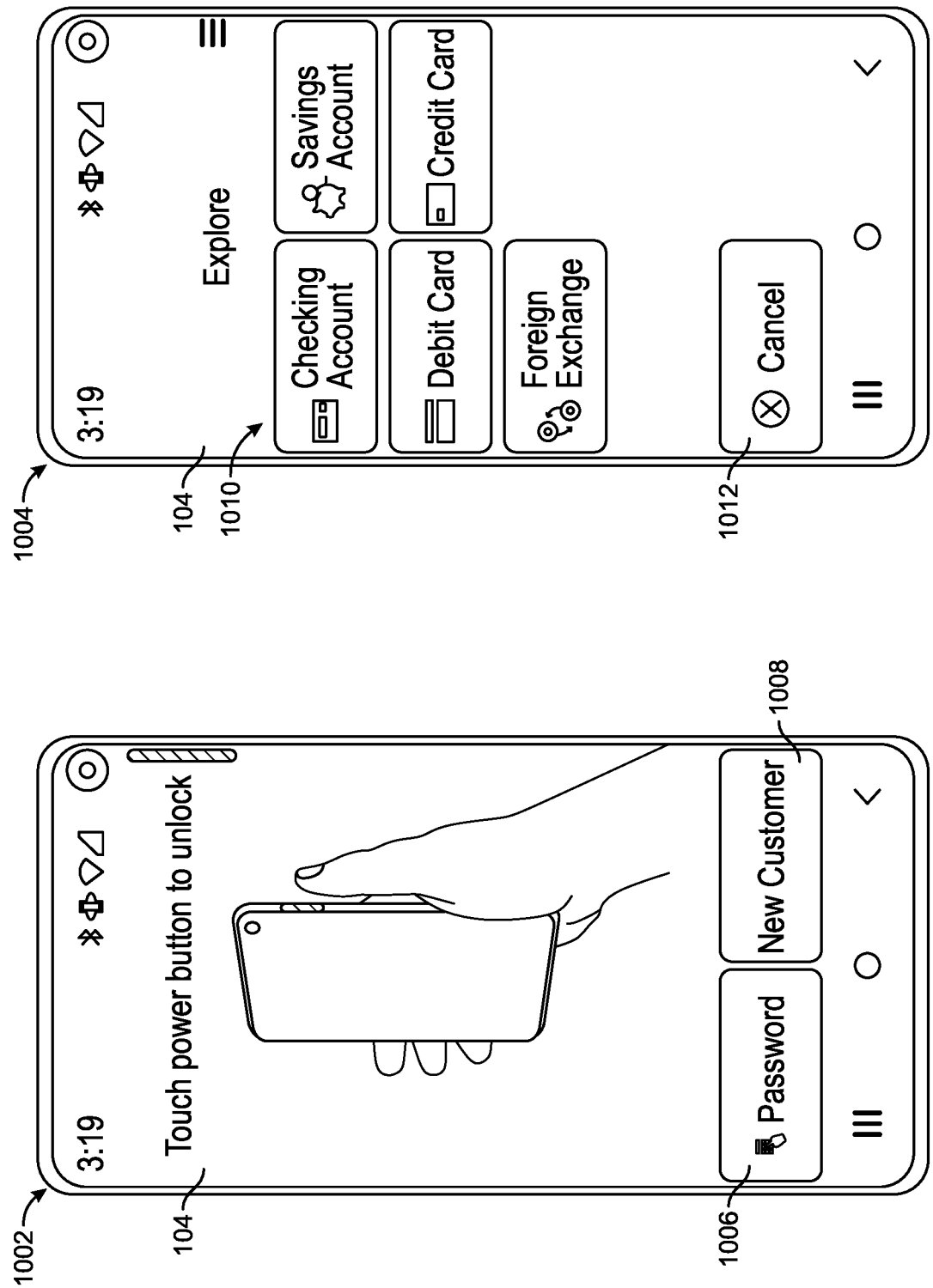
FIG. 10 is an illustration of example user interfaces of the user device of FIG. 1 when the user device is paired to the smart table of FIG. 1, according to example embodiments.

Referring now to FIG. 10, an illustration of example user interfaces of the user device 104 when the user device 104 is paired to the smart table 106 is shown, according to some embodiments. FIG. 10 includes user interface 1002 and user interface 1004. In various embodiments, the user interface 1002 and the user interface 1004 are generated by the smart table system 100 described above with reference to FIG. 1. In some embodiments, the user interface 1002 and the user interface 1004 are generated during the method 300 described above with reference to FIG. 3. The user interface 1002 may be displayed on a user device 104 associated with a customer attempting to pair to a smart table 106, for example. The user interface 1002 may include activatable icons for selecting various options regarding authenticating the customer. In some embodiments, the user interface 1002 includes a password activatable icon 1006 and a new customer activatable icon 1008. In response to receiving a user selection of the password activatable icon 1006, a prompt, generated by the notification generation circuit 214, to enter a password for customer authentication may be displayed. Upon selection of the new customer activatable icon 1008, the notification generation circuit 214 may generate and display a new user interface requesting the user to fill out information to create an account (e.g., a provider account associated with the provider).

The user interface 1004 may be displayed on the user device 104 in response to successful authentication and pairing with the smart table 106. In some embodiments, the user interface 1004 includes activatable icons list 1010 for selecting various options regarding accounts of the customer. For example, the activatable icons list 1010 may include options to view information pertaining to a checking account, a savings account, a debit card, a credit card, and/or foreign exchange. The user interface 1004 may also include a cancel activatable option 1012. In some embodiments, in response to selection of the cancel activatable option 1012, the provider session ends and the established connection between the smart table 106 and the one or more paired user devices 104 ends. In some embodiments, the user device 104 may return to a home page of the user client application 132 in response to receiving a selection of the cancel activatable option 1012.

The terms selectable and activatable are used interchangeably herein. Selectable/activatable icons presented as part of example GUIs may cause a signal to be generated upon selection/activation. The signal may be transmitted to a system, device, or application to indicate to the device, system, or application which icon has been selected, and the device, system, or application may respond accordingly.

Figure 11A:
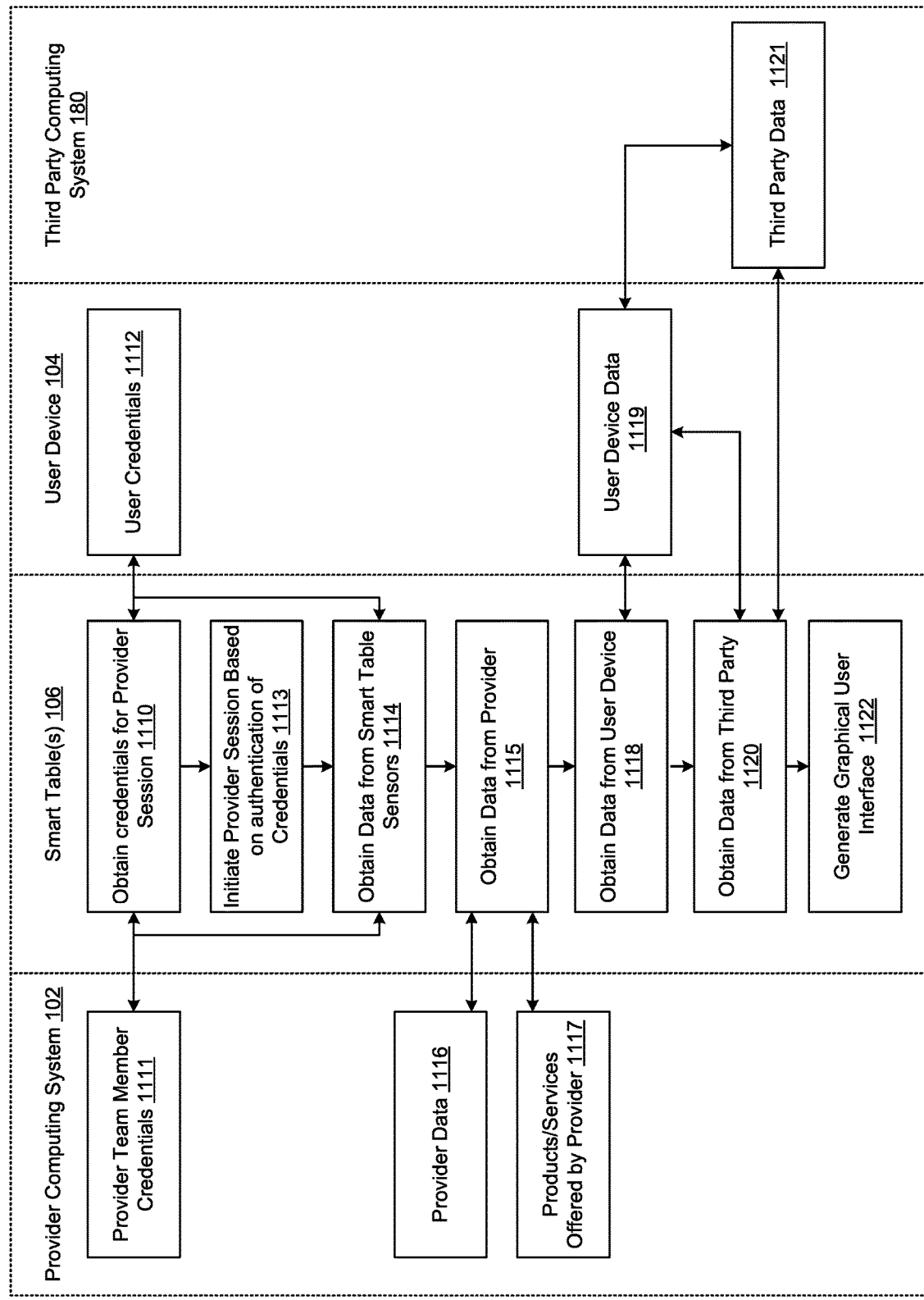
FIG. 11A is a flow diagram of a method for generating a graphical user interface for the smart table of FIG. 1A.
Figure 11B:
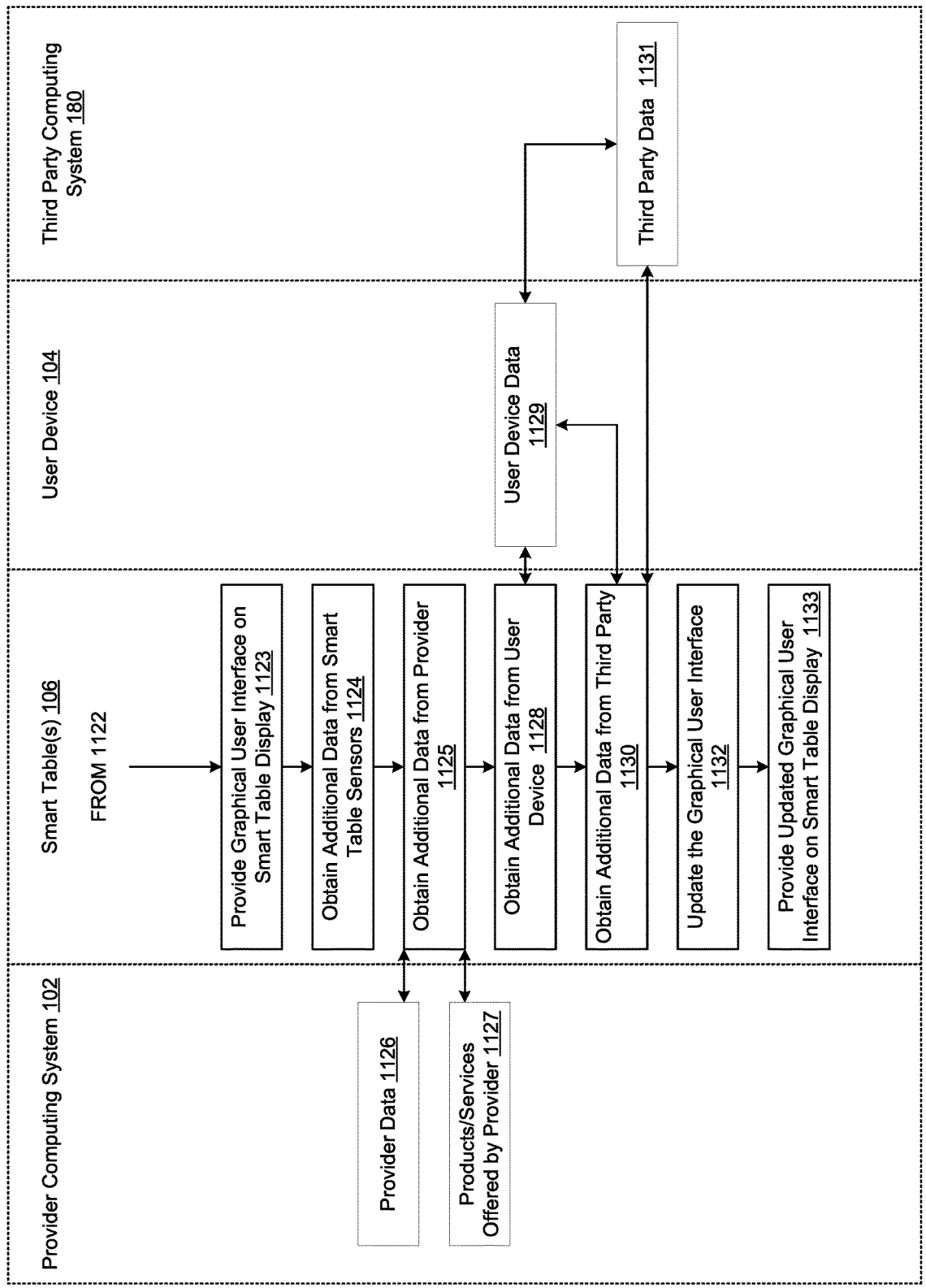
FIG. 11B is a flow diagram of a method for updating a graphical user interface of the smart table of FIG. 1A.

Referring generally to FIGS. 11A, 11B, and 11C, flow diagrams depicting methods 1100, 1101, and 1102 are shown according to various exemplary embodiments. The flow diagram of FIG. 11A depicts a method 1100 of generating a graphical user interface (e.g., a graphical user interface shown on touchscreen display 222, as described above) according to an exemplary embodiment. The flow diagram of FIG. 11B depicts a method 1101 of updating the graphical user interface, according to an exemplary embodiment. The flow diagram of FIG. 11C depicts a method 1102 of processing a transaction, according to an exemplary embodiment. According to an exemplary embodiment, the methods 1100, 1101, and 1102, are performed by one or more of the provider computing system 102, the smart table(s) 106, the user device 104, and the third party computing system 180 of FIG. 1. Additionally, the methods 1100, 1101, and 1102 may be performed sequentially, concurrently, or partially concurrently. For example, the method 1100 may be performed first and the methods 1101 and 1102 may be performed concurrently and after the method 1100. In some embodiments, one or more of the steps of the methods 1100, 1101, and 1102 may be omitted or skipped.

Now referring to FIG. 11A, the method 1100 of generating a graphical user interface by the smart table 106. At step 1110, the smart table 106 obtains credentials for a provider session (e.g., the provider session, as described above). In some embodiments, the authentication method is substantially similar to the authentication method 300 shown in FIG. 3. According to an exemplary embodiment, the smart table 106 may receive provider team member credentials 1111 from the provider computing system 102. In some embodiments, the smart table 106 may receive provider team member credentials 1111 from a smart table interface. For example, a service provider team member may input provider team member credentials 1111 via the touchscreen display 222 (FIG. 2B). Similarly, the smart table 106 may receive user credentials 1112 from the user device 104. For example, the user may provide user credentials 1112 via the user interface 1002 (FIG. 10) as described above. In some embodiments, the smart table 106 may receive user credentials 1112 from the user via the smart table sensors such as the touchscreen display 222 (FIG. 2B).

At step 1113, the smart table 106 initiates a provider session based on authentication of credentials. In some embodiments, the provider session may be managed by the provider session management circuit 210 (FIG. 2B) such that the smart table session includes all the features of the provider session as described above.

At step 1114, the smart table 106 obtains data from various smart table sensors and interfaces. For example, the smart table 106 may receive data from the input/output device 220 such as audio data from the microphone 223 or visual data from the camera 224, as shown in FIG. 2B and described above.

At step 1115, the smart table 106 obtains data from the provider computing system 102. In some embodiments, the smart table 106 may receive, via the input/output device 222 (FIG. 2B), provider data 1116 or data relating to various products or services offered by the provider 1117 from the provider computing system 102. In some embodiments, the smart table 106 may receive the provider data 1116 or the data relating to the products or services offered by the provider 1117 via the network interface 202 (FIG. 2B) and the network 154 (FIG. 1A). The products or services offered by the provider 1117 may include one or more of a loan agreement, a line of credit, financial portfolio management, consumer goods, etc. The provider data 1116 (e.g., first party data) may include customer account data, financial information (e.g., first party financial information), etc. The provider data 1116 may be stored in the customer account database 118 (FIG. 1A).

At step 1118 the smart table 106 obtains user device data 1119 from the user device 104. In some embodiments, the user device data 1119 is obtained utilizing a screen-scraping method. The user device data 1119 may include data from the input/output device 134 (FIG. 1A) such as audio data from a microphone, visual data from a camera, touch input from a touchscreen, etc. The user device data 1119 may also include documents or files saved to the user device database 131 (FIG. 1A). In some embodiments, the step of obtaining user device data 1119 also includes requesting authorization or authentication from the user to access, by the smart table 106, the user device data 1119 on the user device 106. For example, the smart table 106 may connect to the user device 104 via the device interface 221 (FIG. 2B). The smart table 106 may then prompt the user, via a touchscreen display, to authorize the smart table 106 access to the user device data 1119. In some embodiments, the authorization/authentication step may be substantially similar to the method 300 of FIG. 3 or include a graphical user interface such as the graphical user interface 1002 of FIG. 10.

At step 1120, the smart table 106 obtains third party data 1121. The third party data 1121 may include third party data such as account information, credit history, etc. that is not associated with the provider or provider computing system 102. In some embodiments, the third party data 1121 may be obtained directly from the third party computing system 180. In some embodiments, the third party data 1121 may be obtained via the user device 104. In these embodiments, the third party data 1121 is saved to or viewable on the user device 104. The step 1120 may also include an authorization/authentication step as described above.

At step 1122, the smart table 106 generates a graphical user interface. The graphical user interface may depict various graphics, figures, tables, etc. relevant to the ongoing provider session, as described above. According to various exemplary embodiments, the graphical user interface may depict a graph showing historical and predicted financial health of the user. In these embodiments, the smart table 106 may determine a financial health of the user based on the data provider data 1116, the user device data 1119, or the third party data 1121. The smart table may generate the graphical user interface based on the financial health of the user, the products/services offered by the provider 1117 or other factors.

Now referring to FIG. 11B, a flow diagram depicting a method 1101 of updating the graphical user interface is shown, according to various exemplary embodiments. In some embodiments, the method 1101 may continue from step 1122 of method 1100. In some embodiments method 1101 may be performed simultaneously with method 1100.

At step 1123, the smart table provides the graphical user interface that was generated at step 1122 on the smart table display (e.g., touchscreen display 222 of FIG. 2B).

At step 1124, the smart table receives additional data from the smart table sensors. The additional data may include new or updated data from the input/output device 220 (FIG. 2B). In some embodiments, step 1124 is substantially similar to step 1114 (FIG. 11A).

At step 1125, the smart table receives additional data from the provider computing system. The additional data may include new or updated provider data 1126 or products/services offered by the provider 1127. In some embodiments, step 1124 is substantially similar to step 1115 (FIG. 11A).

At step 1128, the smart table 106 obtains additional user device data 1129 from the user device 104. The additional data may include new or updated user device data 1129. In some embodiments, step 1128 is substantially similar to step 1118 (FIG. 11A). For example, the smart table 106 may utilize screen-scraping methods to obtain the additional user device data 1129.

At step 1130, the smart table 106 obtains additional third party data 1131. The additional data may include new or updated third party data 1131. In some embodiments, step 1128 is substantially similar to step 1120 (FIG. 11A). For example, the smart table 106 may obtain the third party data 1131 from either the user device 104 or directly from the third party computing system 180. The additional third party data 1131 can be obtained utilizing screen-scraping based on or in response to determining that the user device 104 is currently accessing third party data or is currently logged into a third party application or website that includes third party data. The determination that the user device 104 is currently accessing third party data or is currently logged into a third party application or website is based on analyzing the audio input in real-time. For example, the smart table system performs screen scrapping on the user device 104 based on a discussion between the user and a team member of the provider regarding a user account held at the third party organization. Accordingly, the audio input can be interpreted to infer that additional data of the user that is not known by the provider exists in a third party system, and based on the inference, the user data stored at the third party system is accessed in real-time while the audio input is being received.

At step 1132, the smart table 160 updates the graphical user interface. The updated graphical user interface may include additional financial information, prompts, notifications, or other graphical representations.

At step 1133, the smart table 106 provides the updated graphical user interface on the smart table display (e.g., touchscreen display 222 of FIG. 2B).

Now referring to FIG. 11C, a flow diagram depicting a method 1102 of processing a transaction is shown, according to various exemplary embodiments. In some embodiments, the method 1102 may continue from step 1122 of method 1100 or step 1133 of method 1101. In some embodiments method 1102 may be performed simultaneously with method 1100, method 1101, or both.

At step 1134 the smart table 106 receives a request for a transaction. According to an exemplary embodiment, the requested transaction is related to products/services offered by the provider 1138. In some embodiments, the request is submitted by the user via the input/output device 220 of the smart table 106 (FIG. 2B), or via the input/output device 134 (FIG. 1A) of the user device. In some embodiments, the smart table 106 receives a request 1140 for a transaction from the user device 104. For example, the user device 104 may send a request for a transaction to the smart table 106 via the device interface 221.

At step 1135, the smart table 106 authenticates the transaction. In some embodiments, the authentication method is substantially similar to the authentication method 300 shown in FIG. 3. In some embodiments, the authentication method is substantially similar to step 1110 (FIG. 11A), as described above. For example, the smart table 106 may receive provider team member credentials 1111 from the provider computing system 102 or user credentials 1112 from the user device 104. Alternatively the smart table 106 may receive provider team member credentials 1111 or user credentials 1112 from various smart table sensors or input/output devices such as touchscreen display 222 (FIG. 2B)

At step 1136, the smart table 106 processes the transaction. Processing the transaction may include updating provider data 1137, the user device data 1138, or the third party data 1139 with data associated with the transaction. For example, the transaction may include a loan agreement. The smart table 106 may transfer funds from the provider to the user to execute the loan agreement. Additionally, the smart table 106 may updated the provider data 1137 with details regarding the loan agreement. In some embodiments, the method 1102 may continue to step 1123 of method 1101 (FIG. 11B).

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuitry" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In some example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Example systems and devices in various embodiments might include a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In some embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A smart table display system comprising:
a display surface; and
a processing circuit configured to:
retrieve, by a communications device, provider data stored in a provider database of a provider system; and
retrieve, by the communications device and a user device, third party data stored in a third party database located remote from the provider system and accessible by the user device;
generate a graphical user interface comprising a graphic that depicts a financial health of a user based on the provider data and the third party data, wherein the graphic is built in real-time while the provider data and the third party data is received; and
provide the graphical user interface on the display surface of the smart table display system;
wherein retrieving at least one of the provider data or the third party data comprises retrieving at least one of the provider data or the third party data from a non-volatile memory of the user device via the communications device utilizing a screen-scraping method.

2. The smart table display system of claim 1, wherein the processing circuit is further configured to:
continuously receive additional data from the communications device; and
update, in real-time, the provider data and the third party data utilizing the additional data.

3. The smart table display system of claim 2, wherein the graphical user interface is continuously updated in real-time utilizing the additional data.

4. The smart table display system of claim 1, wherein the processing circuit is further configured to:
receive a conversation input, the conversation input comprising a conversation and an indication to process a transaction;
responsive to receiving the conversation input, prompt the user, via the display surface, to provide a credential;
receive, via the display surface, the credential;
authenticate the transaction based on the credential; and
update the provider data stored in the provider database based on the transaction.

5. The smart table display system of claim 1, wherein the smart table display system further comprises a sensor configured to detect image data associated with the user.

6. The smart table display system of claim 5, wherein the processing circuit is further configured to:
   receive, from the sensor, the image data associated with the user;
   determine a mood of the user based on the image data; and
   update the graphic based on the mood of the user.

7. The smart table display system of claim 1, wherein the display surface further comprises:
   a first area configured to display a first portion of the graphical user interface in a first orientation; and
   a second area configured to display a second portion of the graphical user interface in a second orientation.

8. The smart table display system of claim 7, wherein the first portion of the graphical user interface and the second portion of the graphical user interface are substantially similar such that the graphic displayed on the graphical user interface is provided on the first area and the second area.

9. The smart table display system of claim 7, wherein the first portion of the graphical user interface and the second portion of the graphical user interface are unique, and wherein the first portion is oriented for the user to view, and wherein the second portion is oriented for a different party to view.

10. A smart table display system comprising:
   an interactive display surface; and
   a processing circuit configured to:
      retrieve provider data stored in a provider system;
      retrieve third party data stored in a third party system, the third party system located remote from the provider system;
      generate a graphic depicting a financial health of a user based on the provider data and the third party data, wherein the graphic is generated in real-time while the provider data and the third party data is received; and
      provide the graphic on the interactive display surface;
      wherein retrieving at least one of the provider data or the third party data comprises retrieving at least one of the provider data or the third party data from a non-volatile memory of a user device associated with the user utilizing a screen-scraping method.

11. The smart table display system of claim 10, further comprising at least one sensor configured to receive a user input.

12. The smart table display system of claim 11, wherein the graphic is a first graphic, and wherein the processing circuit is further configured to:
   predict a future financial health of the user based on the user input, the provider data, and the third party data;
   generate a second graphic based on the future financial health of the user; and
   provide the second graphic on the interactive display surface.

13. The smart table display system of claim 12, wherein the processing circuit is further configured to:
   generate a third graphic depicting a financial transaction based on the user input, the provider data, and the third party data; and
   provide the third graphic on the interactive display surface.

14. The smart table display system of claim 13, wherein the processing circuit is further configured to update, in real-time, the first graphic and the second graphic based on the user input.

15. The smart table display system of claim 14, wherein the user input comprises at least one of a conversation between the user and a team member associated with the provider system, information indicating a mood of the user, a body gesture of the user, or a tactile user input.

16. The smart table display system of claim 10, further comprising a communications device, wherein the communications device is configured to interface with the user device associated with the user, and the non-volatile memory comprising the provider data and the third party data.

17. A smart tabletop display system comprising:
   a display surface;
   a communications device configured to:
      communicate with a user device;
      retrieve third party data associated with a user from a third party system accessible by the user device; and
      retrieve provider data associated with the user from a provider system;
      wherein retrieving at least one of the provider data or the third party data comprises retrieving at least one of the provider data or the third party data from a non-volatile memory of the user device utilizing a screen-scraping method; and
   a processing circuit configured to:
      generate a graphical user interface comprising a first graphic and a second graphic, wherein the first graphic and the second graphic are generated in real-time, and wherein the second graphic is a duplicate of the first graphic; and
      provide the graphical user interface on the display surface, wherein the first graphic is provided in a first orientation for the user to view, and wherein the second graphic is provided in a second orientation different from the first orientation for a different party to view.

18. The smart tabletop display system of claim 17, wherein:
   the user has a user account associated with the provider system;
   the provider data comprises financial data associated with the user; and
   the processing circuit is further configured to continuously update the first graphic and the second graphic based on the provider data.

19. The smart tabletop display system of claim 17, wherein:
   the user has a user account associated with the third party system; and
   the processing circuit is further configured to continuously update the first graphic and the second graphic based on the third party data.

20. The smart tabletop display system of claim 17, further comprising a sensor configured to receive at least one of an audio input or image data, wherein the audio input comprises a conversation between the user and a team member associated with the provider system, and the image data is indicative of a mood of the user.

* * * * *